(12) United States Patent
Liu et al.

(10) Patent No.: US 8,363,753 B2
(45) Date of Patent: Jan. 29, 2013

(54) METHOD FOR TRANSMIT DIVERSITY ENCODING

(75) Inventors: Jianghua Liu, Shenzhen (CN); Branislav Popovic, Sweden (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 13/021,477

(22) Filed: Feb. 4, 2011

(65) Prior Publication Data

US 2011/0129029 A1    Jun. 2, 2011

Related U.S. Application Data

(63) Continuation of application No. PCT/CN2008/071932, filed on Aug. 7, 2008.

(51) Int. Cl.
*H04L 27/04* (2006.01)
*H04B 7/06* (2006.01)

(52) U.S. Cl. .................................... 375/299; 455/101

(58) Field of Classification Search .................. 375/259, 375/260, 261, 279–281, 267, 295, 298, 299, 375/308; 370/203, 206, 208, 210
See application file for complete search history.

(56) References Cited

U.S. PATENT DOCUMENTS

| | | | | |
|---|---|---|---|---|
| 8,135,359 | B2 * | 3/2012 | Raaf et al. | 455/101 |
| 8,208,574 | B2 * | 6/2012 | Haghighat et al. | 375/267 |
| 2004/0252779 | A1 | 12/2004 | Rouquette et al. | |
| 2006/0039500 | A1 | 2/2006 | Yun et al. | |
| 2009/0041151 | A1 * | 2/2009 | Khan et al. | 375/267 |
| 2009/0059884 | A1 * | 3/2009 | Zhang et al. | 370/342 |

FOREIGN PATENT DOCUMENTS

| | | |
|---|---|---|
| CN | 1541459 A | 10/2004 |
| CN | 101208878 A | 6/2008 |
| EP | 1986384 A2 | 10/2008 |
| WO | WO 2007024109 A1 | 3/2007 |
| WO | WO 2007111449 A1 | 10/2007 |
| WO | WO 2007140437 A2 | 12/2007 |

OTHER PUBLICATIONS

International Search Report and Written Opinion of the International Searching Authority issued in corresponding PCT Patent Application No. PCT/CN2008/071932, mailed May 21, 2009.
Extended European Search Report issued in corresponding European Patent Application No. 08783925.4, mailed Nov. 18, 2011.
Ciochina et al., "A Novel Quasi-Orthogonal Space-Frequency Block Code for Single-Carrier FDMA" IEEE 2008.
Ciochina et al., "A Novel Space-Frequency Coding Scheme for Single Carrier Modulations" Mitsubishi Electric, PIMRC 2007.
Nortel, "Way Forward for TxD Scheme for 4 Tx" 7.10.3. 3GPP TSG RAN WG1 Meeting #49, Kobe, Japan, May 7-11, 2007. R1-072383.
$3^{rd}$ Generation Partnership Project, "Technical Specification Group Radio Access Network; Requirements for Further Advancements for E-UTRA (LTE-Advanced)" Release 8, 3GPP TR 36.913. V1.0.0, May 2008.
$3^{rd}$ Generation Partnership Project, "Technical Specification Group Radio Access Network; Evolved Universal Terrestrial Radio Access (E-UTRA); Physical Channels and Modulation" (Release 8), 3GPP TS 36.211. V8.2.0, Mar. 2008.

\* cited by examiner

*Primary Examiner* — Tesfaldet Bocure

(74) *Attorney, Agent, or Firm* — Brinks Hofer Gilson & Lione

(57) ABSTRACT

Transmit diversity coding of symbols employing four antennas is disclosed. An exemplary embodiment of the invention comprises providing blocks of symbols to four transmit antennas, the blocks of symbols being determined by transforming input blocks and extending the blocks by adding zeroes in groups before or after groups of elements in the blocks.

20 Claims, 13 Drawing Sheets

METHOD FOR TRANSMIT DIVERSITY ENCODING

RELATED APPLICATIONS

This patent application is a continuation of PCT International Application No. PCT/CN2008/071932 filed on Aug. 7, 2008, incorporated herein by reference.

TECHNICAL FIELD

The present invention relates to transmit diversity encoding of symbols to be transmitted by a transmitter employing four transmit antennas in a wireless communication system. Method, apparatus and computer program product therefore is disclosed.

BACKGROUND OF THE INVENTION

In 3GPP Long Term Evolution (LTE) (3GPP TS36.211 v8.2.0, "Evolved Universal Terrestrial Radio Access (E-UTRA); Physical Channels and Modulation (Release 8)"), Single Carrier Frequency Division Multiple Access (SC-FDMA) is adopted as uplink multiple access scheme in the form of Discrete Fourier Transform-Spread Orthogonal Frequency Domain Multiplexing (DFT-S-OFDM).

The main advantage with SC-FDMA is the fact that said access scheme has low Peak-to-Average Power Ratio (PAPR) compared with OFDMA. Low PAPR reduces the necessary dynamic range of Power Amplifiers (PAs), and therefore improves the efficiency of PAs, i.e. cell coverage can be extended with the same transmission power.

FIG. 1 shows the transmitter structure for DFT-S-OFDM. Block of M complex modulated symbols $x_n$, $n=0, 1, \ldots, M-1$, is transformed by a Discrete Fourier Transform (DFT) and results in M spectrum coefficients $X_k$ where, $$X_k = \sum_{n=0}^{M-1} x_n e^{-j2\pi \frac{nk}{M}}, k = 0, 1, \ldots, M-1. \tag{1}$$

The output from the DFT is mapped on equidistant sub-carriers $l_k = l_0 + kL$, where $l_0$ is a frequency offset, and L is an integer larger than or equal to 1 (in LTE uplink, L=1). All other inputs to the N-point Inverse Fast Fourier Transform (IFFT) are set to zero. The output of the IFFT, $y_n$, is given by, $$y_n = \frac{1}{M} \sum_{k=0}^{M-1} X_k e^{-j2\pi \frac{nl_k}{N}}, n = 0, 1, \ldots, N-1 \tag{2}$$

Finally, a cyclic prefix is inserted, wherein the insertion of the cyclic prefix does not change the PAPR of the signal.

In LTE uplink, there is only one transmit antenna working at a certain time slot. In order to further optimize and/or improve uplink performance such as e.g. peak data rate, average spectrum efficiency and cell-edge user throughput it has been suggested to increase the number of transmit antennas to four in the uplink, a fact which has been defined in the requirements of LTE-Advanced (3GPP TR36.913 v1.0.0, "Requirements for Further Advancements for E-UTRA (LTE-Advanced) (Release 8)"), hence four transmit antennas in the uplink will therefore be available.

For wireless communication systems having multiple antennas at the transmitter, transmit diversity scheme is a promising candidate to be used to improve performance of the system. Furthermore, transmit diversity schemes usually work in open loop mode, and therefore no feedback information is needed in such schemes. For example, for high speed User Equipments (UEs) in low geometry scenario, open loop spatial multiplexing does not work well because of the low geometry. Also, closed loop beam-forming is not suited for these type of scenarios as Precoding Matrix Indictor (PMI) feedback can not track the channel variations accurately; open loop transmit diversity may therefore be the only candidate to improve the communication reliability in an efficient manner.

Because of the benefits of open loop transmit diversity schemes, such schemes have been widely used in many current standards, such as WCDMA, WiMax, LTE, etc. In LTE-Advanced, four transmit antennas in the uplink will be available, and similarly open loop four antenna transmit diversity scheme should be considered for improving the performance of the system in the uplink.

In LTE downlink, the combination of Space Frequency Block Coding (SFBC) and Frequency Switched Transmit Diversity (FSTD) is defined for a four transmit antennas open loop transmit diversity scheme, which is usually called SFBC+FSTD. The encoding matrix for SFBC+FSTD in the LTE downlink is, $$\text{Antenna} \downarrow \overbrace{\begin{pmatrix} x_0 & x_1 & 0 & 0 \\ 0 & 0 & x_2 & x_3 \\ -x_1^* & x_0^* & 0 & 0 \\ 0 & 0 & -x_3^* & x_2^* \end{pmatrix}}^{\text{Frequency}}, \tag{3}$$

where the four rows of the encoding matrix represent four transmit antennas, and the four columns represent four sub-carriers which should be as consecutive as possible in the frequency domain to keep the orthogonal structure.

The structure above means that $x_0$, $x_1$ are separately transmitted at frequencies $f_1$ and $f_2$ (in the form of sub-carrier index) of antenna 1, and $-x^*_1$, $x^*_0$ are transmitted at frequencies $f_1$ and $f_2$ of antenna 3; while $x_2$, $x_3$ are transmitted at frequencies $f_3$ and $f_4$ of antenna 2, and $-x^*_3$, $x^*_2$ are transmitted at frequencies $f_3$ and $f_4$ of antenna 4.

The operation $$\begin{pmatrix} X_0 & X_1 \\ -X_1^* & X_0^* \end{pmatrix}$$

is called SFBC, which means that $X_0$, $X_1$ are transmitted from sub-carrier $k_1$ and $k_2$ of antenna 1, and $-X^*_1$, $X^*_0$ are simultaneously transmitted from sub-carrier $k_1$ and $k_2$ of antenna 2. Hence, it can be observed that the encoding matrix shown in (3) actually consists of two SFBCs as, $$\begin{pmatrix} x_0 & x_1 \\ -x_1^* & x_0^* \end{pmatrix} \begin{pmatrix} x_2 & x_3 \\ -x_3^* & x_2^* \end{pmatrix}. \tag{4}$$

The first SFBC is transmitted from sub-carrier $k_1$ and $k_2$ of antenna 1 and 3 respectively, and the second SFBC is switched to the other two sub-carriers $k_3$ and $k_4$ of antenna 2 and 4. In LTE downlink, the density of reference signals used for channel estimation is different over the four transmit antennas. The first and the second antenna have the same reference signal density and the density for these antennas is larger than for the third and the fourth antenna. In order to balance the performance of the two SFBCs, it is suggested that the first SFBC is transmitted from antenna 1 and 3, and the second SFBC is transmitted from antenna 2 and 4. However for clarity of description and without loss of generality, in the remaining part of this document the first SFBC is transmitted from antenna 1 and antenna 2 respectively, and the second SFBC is transmitted from antenna 3 and antenna 4, respectively.

In LTE downlink, some downlink control channels (e.g. physical downlink control channel and physical broadcast channel) use SFBC+FSTD to improve detection performance; in addition, SFBC+FSTD is also used for downlink shared channels in low SNR or high speed scenarios. When designing four antenna transmit diversity schemes in the uplink, the PAPR issue of the transmit diversity scheme has to be addressed.

If the current downlink SFBC+FSTD is directly used for uplink transmissions as a transmit diversity scheme for four antennas along with DFT-S-OFDM the frame structure will be as shown in FIG. 2. Block of M DFT samples $X_k$, k=1, 2, . . . , M are encoded with SFBC+FSTD, $$\begin{pmatrix} X_0 & X_1 & 0 & 0 & X_4 & X_5 & 0 & 0 & \cdots & \cdots & X_{M-4} & X_{M-3} & 0 & 0 \\ -X_1^* & X_0^* & 0 & 0 & -X_5^* & X_4^* & 0 & 0 & \cdots & \cdots & -X_{M-3}^* & X_{M-4}^* & 0 & 0 \\ 0 & 0 & X_2 & X_3 & 0 & 0 & X_6 & X_7 & \cdots & \cdots & 0 & 0 & X_{M-2} & X_{M-1} \\ 0 & 0 & -X_3^* & X_2^* & 0 & 0 & -X_7^* & X_6^* & \cdots & \cdots & 0 & 0 & -X_{M-1}^* & X_{M-2}^* \end{pmatrix}, \quad (5)$$

wherein the four rows are separately mapped onto M consecutive sub-carriers of four antennas. The block of M DFT samples $X_k$, k=0, 1, . . . , M−1 are the spectrum coefficients of one single carrier signal $x_k$, k=0, 1, . . . , M−1. After the mapping, it can be observed that the signals mapped on each antenna are only part of the spectrum coefficients of the original single carrier signal $x_k$, k=0, 1, . . . , M−1 (e.g. $X_0, X_1, X_4, X_5, X_8, X_9, \ldots, X_{M-4}, X_{M-3}$ are mapped onto the first antenna), which implies that the transmitted signal on each antenna is not a single carrier signal. The loss of the single carrier property causes the PAPR of the signal to increase. The numerical evaluation of the increase in PAPR when employing the current SFBC+FSTD along with DFT-S-OFDM for the different antennas compared to a single carrier signal is shown in FIG. 4.

In another prior art solution, a space frequency coding scheme is proposed for SC-FDMA to preserve the single carrier property in the case of two transmit antennas. In this scheme, for a block of M DFT samples $X_k$, k=0, 1, . . . , M−1 of a time domain single carrier signal; first form pairs (k1,k2), where k1, k2 is the index of the DFT samples and k1=0, 1, 2, . . . M−1, k2=(M/2−k1) mod M; then perform SFBC between the k1-th sample $X_{k1}$ and the k2-th sample $X_{k2}$; SFBC is operated as $$\begin{pmatrix} X_{k1} & X_{k2} \\ -X_{k2}^* & X_{k1}^* \end{pmatrix}$$

when k1 is odd, and as $$\begin{pmatrix} X_{k1} & X_{k2} \\ X_{k2}^* & -X_{k1}^* \end{pmatrix}$$

when k1 is even. The encoding matrix on the block of M DFT samples is shown in matrix (6), $$\begin{pmatrix} X_0 & X_1 & \cdots & \cdots & X_{M/2-2} & X_{M/2-1} & X_{M/2} & X_{M/2+1} & \cdots & \cdots & X_{M-2} & X_{M-1} \\ -X_{M/2-1}^* & X_{M/2-2}^* & \cdots & \cdots & -X_1^* & X_0^* & -X_{M-1}^* & X_{M-2}^* & \cdots & \cdots & -X_{M/2-1}^* & X_{M/2}^* \end{pmatrix}. \quad (6)$$

The two rows are mapped onto the two transmit antennas, respectively. The proposed scheme enables the signals transmitted from two transmit antennas to have the same PAPR as a single carrier signal, but said scheme is only useful for two transmit antennas.

In a yet another prior art solution, a space-frequency transmit diversity scheme for four antenna SC-FDMA is proposed. The scheme is based on quasi-orthogonal space frequency block code for four antennas according to, $$\begin{pmatrix} X_0 & X_1 & X_2 & X_3 \\ -X_1^* & X_0^* & -X_3^* & X_2^* \\ X_2 & X_3 & X_0 & X_1 \\ -X_3^* & X_2^* & -X_1^* & X_0^* \end{pmatrix}. \quad (9)$$

If columns of one matrix can be divided into groups, wherein the columns within each group are not orthogonal to each other, but the columns from different groups are orthogonal to each other, then the matrix is called quasi-orthogonal. For the encoding matrix shown in (9) the four columns could be divided into two groups, wherein the first group includes the first column and the third column, and the second group includes the remaining two columns. It can be observed that the two columns in each group are not orthogonal, but the columns from two different groups are orthogonal to each other, and hence the encoding matrix (9) is a quasi-orthogonal matrix. The four rows of the quasi-orthogonal matrix defined in (9) represent four different transmit antennas, and the columns represent four sub-carriers, therefore said scheme is called quasi-orthogonal space frequency block code.

In general, the above encoding matrix is repeated over every four sub-carrier to obtain the structure, $$\begin{pmatrix} X_0 & X_1 & X_2 & X_3 & X_4 & X_5 & X_6 & X_7 & \cdots & X_{M-4} & X_{M-3} & X_{M-2} & X_{M-1} \\ -X_1^* & X_0^* & -X_3^* & X_2^* & -X_5^* & X_4^* & -X_7^* & X_6^* & \cdots & -X_{M-3}^* & X_{M-4}^* & -X_{M-1}^* & X_{M-2}^* \\ X_2 & X_3 & X_0 & X_1 & X_6 & X_7 & X_4 & X_5 & \cdots & X_{M-2} & X_{M-1} & X_{M-4} & X_{M-3} \\ -X_3^* & X_2^* & -X_1^* & X_0^* & -X_7^* & X_6^* & -X_5^* & X_4^* & \cdots & -X_{M-1}^* & X_{M-2}^* & -X_{M-3}^* & X_{M-4}^* \end{pmatrix}, \quad (10)$$

where $X=\{X_0, X_1, \ldots, X_{M-1}\}$ is a block of M DFT samples of a time domain single carrier signal. Regarding the signals transmitted from the four antennas in (10), only the signal transmitted from the first antenna is a single carrier signal.

What has been done in this prior art solution is to make the signals transmitted from the remaining three antennas to be single carrier signals while preserving the quasi-orthogonal structure to achieve transmit diversity. Said prior art solution works as follows:

1. A block of M DFT samples $X=\{X_0, X_1, \ldots, X_{M-1}\}$, which constitutes a first branch, is cyclically shifted with a cyclically shift size M/2 to obtain a block of DFT samples $Y=\{Y_k | Y_k = X_{(k-M/2) \bmod M}, k=0, 1, \ldots, M-1\}$ which represents a third branch for quasi-orthogonal space frequency coding.

2. The block of M DFT samples X is reversed, cyclically shifted and conjugated, and then a minus sign is added on every other of the DFT samples to obtain a block of M DFT samples A which represents a second branch for quasi-orthogonal space frequency coding. Similarly, the same operations are performed on Y to obtain a block of M DFT samples B which represents a fourth branch for quasi-orthogonal space frequency coding.

Finally, the four blocks of DFT samples X, A, Y, B are grouped as an encoding matrix, $$\begin{pmatrix} X_0 & X_1 & \cdots & X_k & \cdots & X_{M-1} \\ A_0 & A_1 & \cdots & A_k & \cdots & A_{M-1} \\ Y_0 & Y_1 & \cdots & Y_k & \cdots & Y_{M-1} \\ B_0 & B_1 & \cdots & B_k & \cdots & B_{M-1} \end{pmatrix} \quad (11)$$

where $A_k = (-1)^{k+1} X_{(p-1-k) \bmod M}^*, k=0, 1, \ldots, M-1$ $Y_k = X_{(k-M/2) \bmod M}, k=0, 1, \ldots, M-1$ $B_k = (-1)^{k+1} Y_{(p-1-k) \bmod M}^*, k=0, 1, \ldots, M-1$, and where the corresponding samples of the four columns, $$k, (p-1-k) \bmod M, (k-M/2) \bmod M, (p-M/2-1-k) \bmod M,$$

can be expressed by formula (12a) and (12b) below, where the formula (12a) corresponds to when k is an even number, and the formula (12b) corresponds to when k is an odd number, respectively, $$\begin{pmatrix} X_k & X_{(p-1-k) \bmod M} & X_{(k-M/2) \bmod M} & X_{(p-M/2-1-k) \bmod M} \\ -X_{(p-1-k) \bmod M}^* & X_k^* & -X_{(p-M/2-1-k) \bmod M}^* & X_{(k-M/2) \bmod M}^* \\ X_{(k-M/2) \bmod M} & X_{(p-M/2-1-k) \bmod M} & X_k & X_{(p-1-k) \bmod M} \\ -X_{(p-M/2-1-k) \bmod M}^* & X_{(p-M/2-3) \bmod M}^* & -X_{(p-M/2-1-k) \bmod M}^* & X_{(p-M/2-1) \bmod M}^* \end{pmatrix}, \quad (12a)$$

$$\begin{pmatrix} X_k & X_{(p-1-k) \bmod M} & X_{(k-M/2) \bmod M} & X_{(p-M/2-1-k) \bmod M} \\ X_{(p-1-k) \bmod M}^* & -X_k^* & X_{(p-M/2-1-k) \bmod M}^* & -X_{(k-M/2) \bmod M}^* \\ X_{(k-M/2) \bmod M} & X_{(p-M/2-1-k) \bmod M} & X_k & X_{(p-1-k) \bmod M} \\ X_{(p-M/2-1-k) \bmod M}^* & -X_{(p-M/2-3) \bmod M}^* & X_{(p-M/2-1-k) \bmod M}^* & -X_{(p-M/2-1) \bmod M}^* \end{pmatrix}. \quad (12b)$$

It can be proved that the encoding matrices (12a) and (12b) satisfy the condition of quasi-orthogonal matrix. The difference between equations (10) and (11) is that the indices of the four samples used to create any quasi-orthogonal space-frequency coding matrix are not consecutive, but the quasi-orthogonal space-frequency coding structure is kept.

The structure proposed in the above prior art solution makes the signal transmitted from each antenna to have the property of a single carrier signal, while at the same time utilise the quasi-orthogonal space frequency coding structure to achieve transmit diversity. However, the disadvantage with quasi-orthogonal space frequency coding is the high increase in decoding complexity because inversion of a larger size matrix needs to be done. Another major drawback with this prior art solution is the performance loss in terms of Block Error Rate (BLER) compared with SFBC+FSTD.

SUMMARY

According to one aspect of the present invention shortcomings in prior art are overcome with a method for transmit diversity encoding of symbols to be transmitted by a transmitter in a wireless communication system, wherein said transmitter employs four transmit antennas. The method comprises:

for a first block of symbols and a second block of symbols wherein said first block of symbols and said second block of symbols, each block of symbols being represented by a number of elements, the number being equal to L, determining a third block of symbols, being represented by L elements, by reversing, cyclically shifting and conjugating the elements representing said first block of symbols and adding a minus sign to every other of the elements achieved from the reversing, cyclically shifting and conjugating the elements representing the first block of symbols, determining a fourth block of symbols, being represented by L elements, by reversing, cyclically shifting and conjugating the elements representing said second block of symbols and adding a minus sign to every other of the elements achieved from the reversing, cyclically shifting and conjugating the elements representing the second block of symbols, inserting a number of zeroes, the number being equal to D, after every group of D consecutive elements of the elements representing said first and third block of symbols, respectively, so as to obtain a modified first block of symbols for transmission and a modified third block of symbols for transmission, and inserting a number of zeros, the number being equal to D, before every group of D consecutive elements of the elements representing said second and fourth block of symbols, respectively, so as to obtain a modified second block of symbols for transmission and a modified fourth block of symbols for transmission, wherein said modified first, second, third, and fourth block of symbols for transmission are provided for transmission from said four transmit antennas.

An example apparatus for transmit diversity encoding of symbols to be transmitted by a transmitter in a wireless communication system is provided, wherein said transmitter employs four transmit antennas, and comprises processing circuitry configured for operations on a first block of symbols, X, and a second block of symbols, Y, wherein said first block of symbols, X, and said second block of symbols, Y, each are represented by a number of elements, the number being equal to L, comprising a transform entity for determining a third block of symbols, A, corresponding to reversing, cyclically shifting and conjugating the elements representing said first block of symbols, X, and adding a minus sign to every other of the elements as achieved from the reversing, cyclical shifting and conjugating of the elements representing first block of symbols X, and for determining a fourth block of symbols, B, corresponding to reversing, cyclically shifting and conjugating the elements representing said second block of symbols, Y, and adding a minus sign to every other of the elements as achieved from the reversing, cyclical shifting and conjugating of the elements representing second block of symbols, Y; and an extension entity configured for inserting a number of zeros, the number being equal to D, corresponding to after every group of D consecutive elements inserting D consecutive zeroes for said first block of symbols, X, and said third block of symbols, A, so as to obtain a modified first block of symbols for transmission, X', and a modified third block of symbols for transmission, A', and for inserting a number of zeros, the number being equal to D, corresponding to before every group of D consecutive elements inserting D consecutive zeroes for said second block of symbols, Y, and said fourth block of symbols, B, so as to obtain a modified second block of symbols for transmission, Y', and a modified fourth block of symbols for transmission, B', the apparatus being arranged for providing said modified first, second, third, and fourth block of symbols for transmission, X', Y', A', B', for transmission from said four transmit antennas.

Preferred embodiments of the present invention provide a method and an apparatus for transmit diversity encoding of symbols to be transmitted by a transmitter employing four transmit antennas which has PAPR as for a single carrier signal, and which shows good performance in terms of BLER. Furthermore, the decoding complexity is relative small compared with prior art solutions because the size of an inverting matrix for decoding may be reduced to one half with encoding according to the preferred embodiment.

Different embodiments of the method according to the present invention are disclosed. An example apparatus according to the present invention is configured in accordance with the different embodiments of the method.

Example embodiments and advantages of the present invention will described in the detailed description with reference to the appended drawings.

BRIEF DESCRIPTION OF THE DRAWINGS

The appended drawings are intended to clarify and explain the present invention where.

DETAILED DESCRIPTION

As described above, SFBC+FSTD actually consists of two SFBC branches as shown in (5), wherein the first branch is transmitted on the first two transmit antennas, and the second branch is transmitted on the last two transmit antennas. If the two branches of SFBC+FSTD are directly replaced by the proposed prior art solution described in relation to equation 5, the single carrier property of each antenna is lost because the original signal transmitted on each antenna is not a single carrier signal, and hence will result in an increase in the PAPR.

For example, given the DFT size is M=16, the encoding matrix of SFBC+FSTD according to (5) should be, $$\begin{pmatrix} X_0 & X_1 & 0 & 0 & X_4 & X_5 & 0 & 0 & X_8 & X_9 & 0 & 0 & X_{12} & X_{13} & 0 & 0 \\ -X_1^* & X_0^* & 0 & 0 & -X_5^* & X_4^* & 0 & 0 & -X_9^* & X_8^* & 0 & 0 & -X_{13}^* & X_{12}^* & 0 & 0 \\ 0 & 0 & X_2 & X_3 & 0 & 0 & X_6 & X_7 & 0 & 0 & X_{10} & X_{11} & 0 & 0 & X_{14} & X_{15} \\ 0 & 0 & -X_3^* & X_2^* & 0 & 0 & -X_7^* & X_6^* & 0 & 0 & -X_{11}^* & X_{10}^* & 0 & 0 & -X_{15}^* & X_{14}^* \end{pmatrix} \quad (7)$$

If the proposed prior art solution as shown in (6) is used in SFBC+FSTD, the above encoding matrix is changed to, $$\begin{pmatrix} X_0 & X_1 & 0 & 0 & X_4 & X_5 & 0 & 0 & X_8 & X_9 & 0 & 0 & X_{12} & X_{13} & 0 & 0 \\ -X_5^* & X_4^* & 0 & 0 & -X_1^* & X_0^* & 0 & 0 & -X_{13}^* & X_{12}^* & 0 & 0 & -X_9^* & X_8^* & 0 & 0 \\ 0 & 0 & X_2 & X_3 & 0 & 0 & X_6 & X_7 & 0 & 0 & X_{10} & X_{11} & 0 & 0 & X_{14} & X_{15} \\ 0 & 0 & -X_7^* & X_6^* & 0 & 0 & -X_3^* & X_2^* & 0 & 0 & -X_{15}^* & X_{14}^* & 0 & 0 & -X_{11}^* & X_{10}^* \end{pmatrix} \quad (8)$$

And from matrix (8), it can be observed that only part of spectrum coefficients of the single carrier signal $x_k$, k=0, 1 . . . , 15 are transmitted on each antenna; obviously it is not a single carrier signal for each antenna, and therefore in this case PAPR would be increased compared to the PAPR for a single carrier signal.

Figure 1:
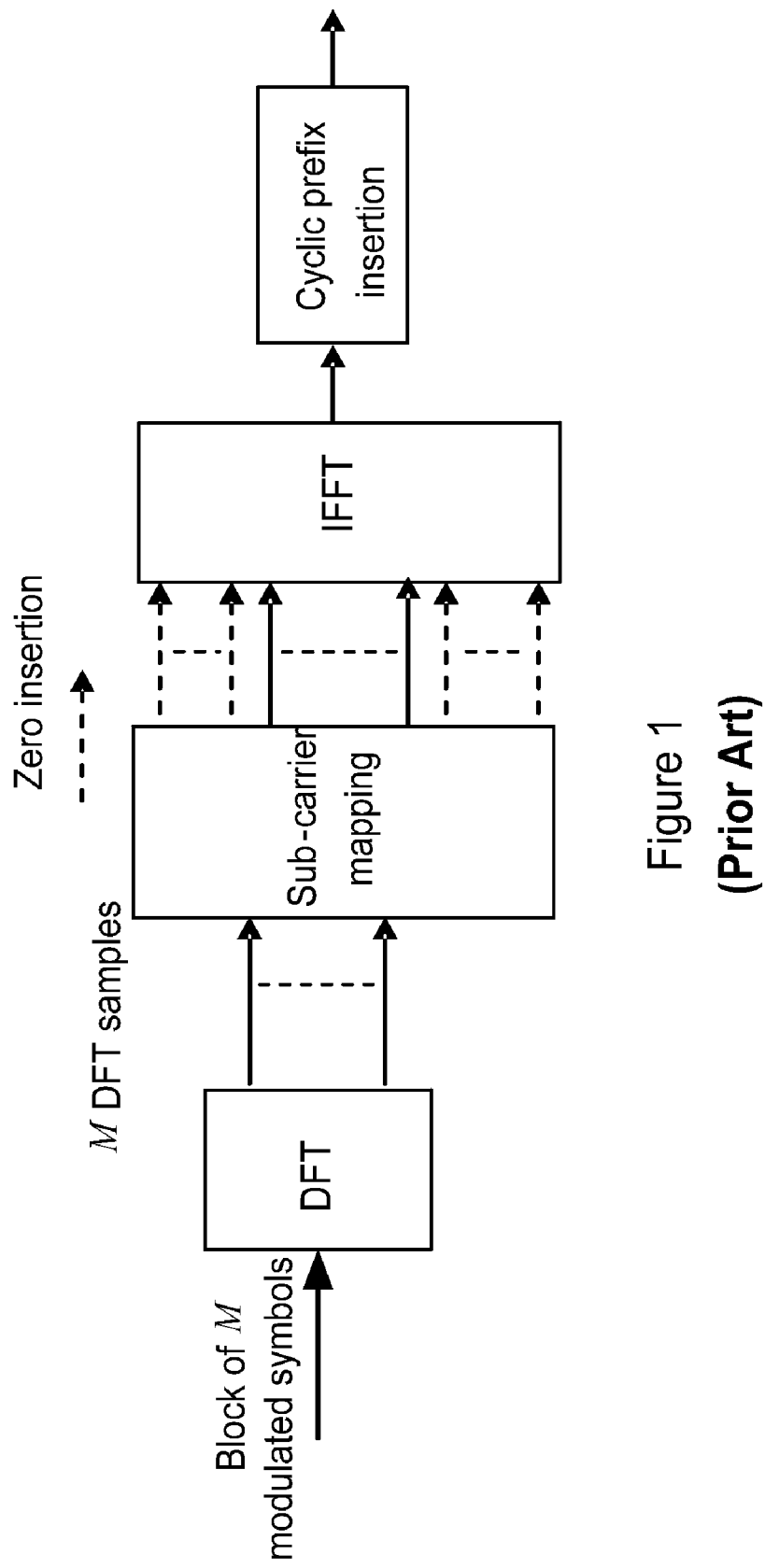
FIG. 1 shows the basic DFT-spread OFDM transmitter structure available in prior art.
Figure 2:
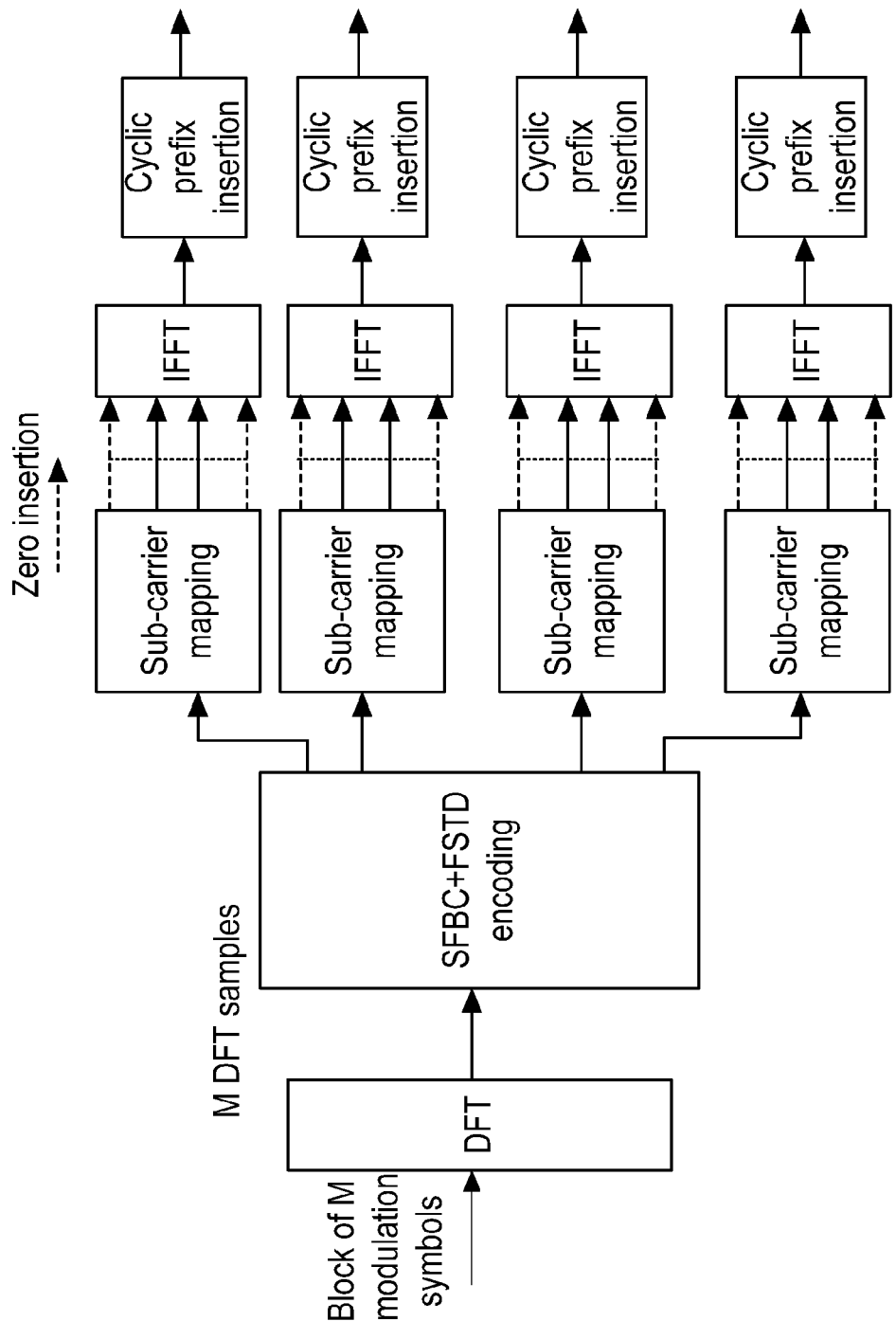
FIG. 2 shows the frame structure of SFBC+FSTD applied in the uplink along with DFT-S-OFDM of prior art.
Figure 3:
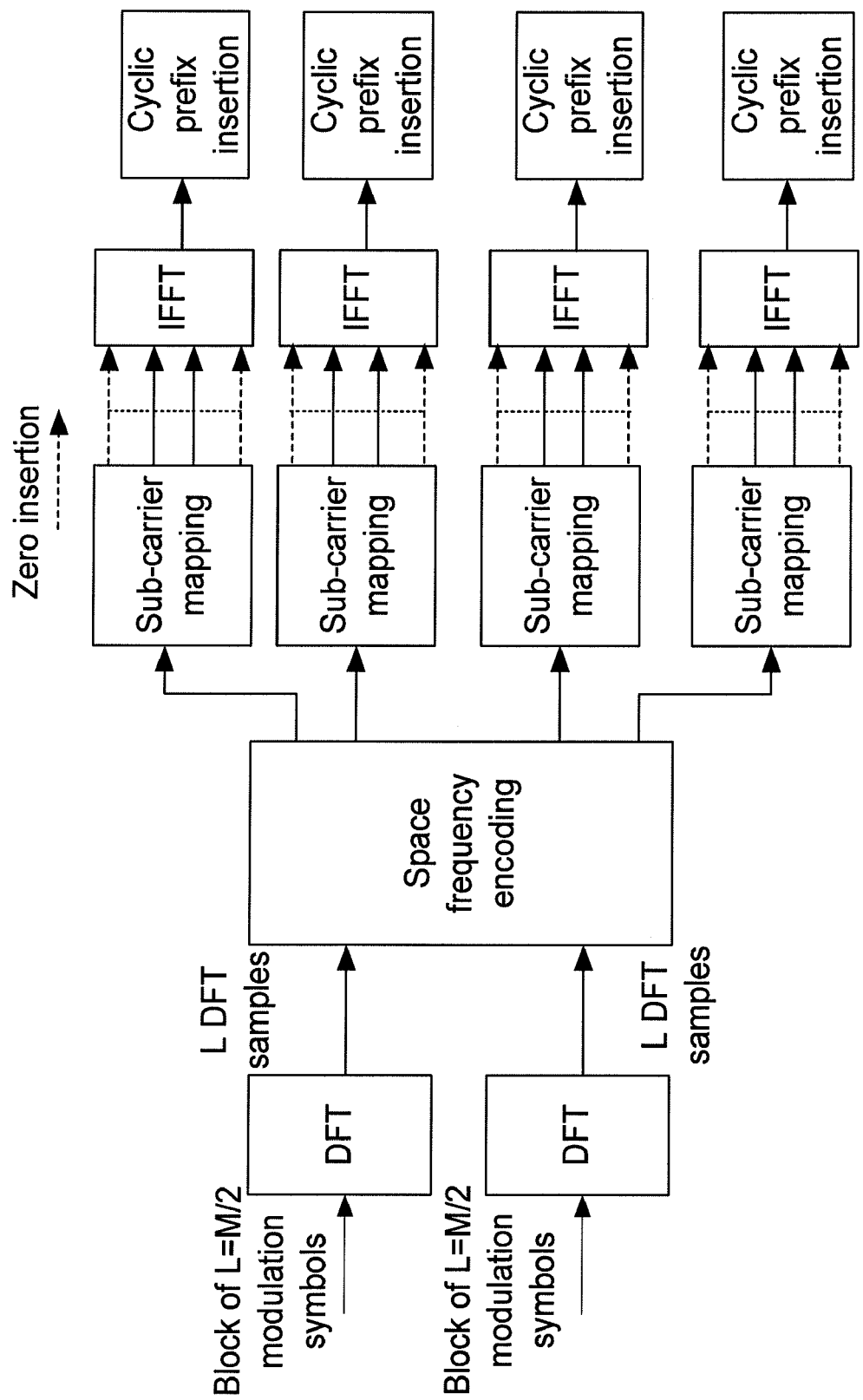
FIG. 3 shows the frame structure according to an example embodiment of the present invention applied in the uplink along with DFT-S-OFDM.

A frame structure of a preferred encoding scheme according to the present invention applied in the uplink along with DFT-S-OFDM is shown in FIG. 3. It should however be observed that the method according to the present invention is also applicable in the downlink of a wireless communication system, and hence the frame structure in FIG. 3 is a non-limiting example.

Input symbols are split into two blocks of time domain modulation symbols $x=\{x_0, x_1, \ldots, x_{L-1}\}$ and $y=\{y_0, y_1, \ldots, y_{L-1}\}$, where said two blocks of time domain modulation symbols each comprises L number of elements, and each element corresponds to a time domain modulation symbol, which may come from the same codeword or two different codewords. Each element $x_i$ or $y_i$, i=0, 1, 2, . . . , L−1 is a complex-valued symbol from a modulation constellation such as e.g. BPSK (Binary Phase Shift Keying), QPSK (Quadrature Phase Shift Keying), 16QAM (Quadrature Amplitude Modulation), 64QAM etc; L is the DFT size, and M=2L is the number of allocated sub-carriers. Two L point DFT operations are performed on the two blocks of time domain symbols x, y separately to obtain a first and a second block of symbols $X=\{X_0, X_1, \ldots, X_{L-1}\}$ and $Y=\{Y_0, Y_1, \ldots, Y_{L-1}\}$, where said first and said second block of symbols X and Y each comprises L number of elements, and wherein each element corresponds to a DFT sample where, $$X_k = \sum_{n=0}^{L-1} x_n \exp\left(\frac{-j2\pi nk}{L}\right), k = 0, 1, 2, \ldots, L-1 \quad (13)$$

$$Y_k = \sum_{n=0}^{L-1} y_n \exp\left(\frac{-j2\pi nk}{L}\right), k = 0, 1, 2, \ldots, L-1.$$

The encoding method according to the invention is performed as follows:

1. The elements in the first block of symbols X are reversed, cyclically shifted, with cyclic shift size p, and conjugated, and then a minus sign is added on every other element to obtain a third block of symbols A as a second branch for SFBC. Similarly, a fourth block of symbols B is obtained through performing the same operations on the elements in the second block of symbols Y.

2. Blocks of D number of zeros are inserted after each D number of elements in the first and second block of symbols X and A to obtain a first and a third modified block of symbols for transmission X' and A', respectively, while blocks of D number of zeros are inserted before each D number of elements in the second and fourth block of symbols Y and B to obtain a second and a fourth modified block of symbols for transmission Y' and B', respectively.

After the operations of reversing, cyclically shifting and conjugating the elements in the first block of symbols X, and adding a minus sign to every other element of the reversed, cyclically shifted and conjugated first block of symbols X to obtain the third block of symbols A the relation between the elements in X and A is according to one embodiment of the invention $A_k=(-1)^{k+1}X^*_{(L-1-k-p)modL}$, k=0, 1, . . . , L−1, and in the same way the relation between the elements in Y and B in said embodiment is $B_k=(-1)^{k+1}Y^*_{(L-1-k-p)modL}$, k=0, 1, . . . , L−1, where mod is the modulo L operator, p is the cyclically shift size, and $X^*_{(L-1-k-p)mod\,L}$ and $Y^*_{(L-1-k-p)mod\,L}$ is the complex conjugate of the ((L−1−k−p)mod L)th element of said first and second block of symbols X, Y, respectively.

According to another embodiment of the invention the relation between the elements in X and A, and between the elements in Y and B may also be expressed as $A_k=(-1)^k X^*_{(L-1-k-p)modL}$, k=0, 1, . . . , L−1, and $B_k=(-1)^k Y^*_{(L-1-k-p)modL}$, k=0, 1, . . . , L−1, respectively, where mod is the modulo L operator, p is the cyclically shift size, and $X^*_{(L-1-k-p)mod\,L}$ and $Y^*_{(L-1-k-p)mod\,L}$ is the complex conjugate of the ((L−1−k−p)mod L)th element of said first and second block of symbols X, Y, respectively. This is due to the fact that the minus sign added to every other element may be on even or odd elements, i.e. on the kth or the (k−1)th element.

The obtained modified blocks of symbols for transmission X', Y', A', B' may in one embodiment of the invention be arranged in an encoding matrix for transmission T which will have the general from, $$T = \begin{pmatrix} X_0 \; X_1 \; \ldots \; X_{D-1} & \overbrace{0 \; 0 \; \ldots \; 0}^{D \text{ zeros}} & X_D \; X_{D+1} \; \ldots \; X_{2D-1} & \overbrace{0 \; 0 \; \ldots \; 0}^{D \text{ zeros}} & \ldots & X_{L-D} \; X_{L-D+1} \; \ldots \; X_{L-1} & \overbrace{0 \; 0 \; \ldots \; 0}^{D \text{ zeros}} \\ A_0 \; A_1 \; \ldots \; A_{D-1} & \overbrace{0 \; 0 \; \ldots \; 0}^{D \text{ zeros}} & A_D \; A_{D+1} \; \ldots \; A_{2D-1} & \overbrace{0 \; 0 \; \ldots \; 0}^{D \text{ zeros}} & \ldots & A_{L-D} \; A_{L-D+1} \; \ldots \; A_{L-1} & \overbrace{0 \; 0 \; \ldots \; 0}^{D \text{ zeros}} \\ \overbrace{0 \; 0 \; \ldots \; 0}^{D \text{ zeros}} & Y_0 \; Y_1 \; \ldots \; Y_{D-1} & \overbrace{0 \; 0 \; \ldots \; 0}^{D \text{ zeros}} & Y_D \; Y_{D+1} \; \ldots \; Y_{2D-1} & \ldots & \overbrace{0 \; 0 \; \ldots \; 0}^{D \text{ zeros}} & Y_{L-D} \; Y_{L-D+1} \; \ldots \; Y_{L-1} \\ \overbrace{0 \; 0 \; \ldots \; 0}^{D \text{ zeros}} & B_0 \; B_1 \; \ldots \; B_{D-1} & \overbrace{0 \; 0 \; \ldots \; 0}^{D \text{ zeros}} & B_D \; B_{D+1} \; \ldots \; B_{2D-1} & \ldots & \overbrace{0 \; 0 \; \ldots \; 0}^{D \text{ zeros}} & B_{L-D} \; B_{L-D+1} \; \ldots \; B_{L-1} \end{pmatrix} \quad (14a)$$

$$X = \{X_0, X_1, \ldots, X_{L-1}\} \quad (14b)$$
$$A = \{A_k \mid A_k = (-1)^{k+1} X^*_{(L-1-k-p) \bmod L}, k = 0, 1, 2, \ldots, L-1\}$$
$$Y = \{Y_0, Y_1, \ldots, Y_{M-1}\}$$
$$B = \{B_k \mid B_k = (-1)^{k+1} Y^*_{(L-1-k-p) \bmod L}, k = 0, 1, 2, \ldots, L-1\},$$

where each row in said encoding matrix T for transmission corresponds to one of said four transmit antennas, and each column in said encoding matrix for transmission corresponds to a sub-carrier, and wherein the kth element in said first, second, third and fourth block of symbols are represented by $X_k, Y_k, A_k, B_k$, respectively, where k=0, 1, . . . , L−1.

In an embodiment of the invention D equals L, and the encoding matrix T will have the form, $$T = \begin{pmatrix} X_0 \; X_1 \; X_2 \; \ldots \; X_{L-2} \; X_{L-1} & \overbrace{0 \; 0 \; 0 \; \ldots \; 0 \; 0}^{L \text{ zeros}} \\ A_0 \; A_1 \; A_2 \; \ldots \; A_{L-2} \; A_{L-1} & \overbrace{0 \; 0 \; 0 \; \ldots \; 0 \; 0}^{L \text{ zeros}} \\ \overbrace{0 \; 0 \; 0 \; \ldots \; 0 \; 0}^{L \text{ zeros}} & Y_0 \; Y_1 \; Y_2 \; \ldots \; Y_{L-2} \; Y_{L-1} \\ \overbrace{0 \; 0 \; 0 \; \ldots \; 0 \; 0}^{L \text{ zeros}} & A_0 \; A_1 \; A_2 \; \ldots \; A_{L-2} \; A_{L-1} \end{pmatrix}. \quad (15)$$

According to the property of IFFT, to append a number of zeros after/before a signal in the frequency domain is equivalent to interpolation in the time domain, and therefore to append a number of zeros after/before the spectrum coefficients of a single carrier signal does not change the property of a single carrier signal in terms of PAPR. Since the elements of the first block of symbols X are the frequency spectrum coefficients of the single carrier signal x, to append zeros as shown in (15) will not change the single carrier property of signal x. Similarly, the appending of zeros on the second block of symbols Y will not change the single carrier property of signal y. Therefore, it may be concluded that the signal transmitted on the first or the third antenna has the same PAPR as a single carrier signal.

It shall now be proved that the elements of the third block of symbols A are also the spectrum coefficients of a single carrier signal. From (14b) it follows that, $$a_n = \sum_{k=0}^{L-1} A_k e^{\frac{j2\pi kn}{L}} \quad (16)$$

$$= \sum_{k=0}^{L-1} (-1)^{k+1} X^*_{(L-1-k-p) \bmod L} e^{\frac{j2\pi kn}{L}}$$

$$= \sum_{m=0}^{L-1} (-1)^{L-p-m} X^*_m e^{\frac{-j2\pi n(1+p+m)}{L}}$$

-continued $$= (-1)^{L-p} e^{\frac{-j2\pi n(1+p)}{L}} \left( \sum_{m=0}^{L-1} X_m e^{\frac{j2\pi(n-L/2)m}{L}} \right)^*$$

$$= (-1)^{L-p} e^{\frac{-j2\pi n(1+p)}{L}} x^*_{(n-L/2) \bmod L}, n = 0, 1, \ldots, L-1.$$

It can be observed that the corresponding time domain signal of A in (16) is obtained by cyclically shifting, conjugating and phase shifting the elements in x, and also has the same amplitude property as x because the operation of cyclically shifting, conjugating and phase shifting do not change the amplitude of the element. Therefore the time domain signal $a_n$, n=0, 1, . . . L−1 is a single carrier signal. In the same way, it can be proved that the corresponding time domain signal of B is also a single carrier signal. Applying the same reasoning for the first and second block of symbols X and Y, it can be concluded that the signal transmitted on the second or the fourth antenna also has the same PAPR as a single carrier signal.

In an embodiment of the invention D equals 1, and the encoding matrix T will therefore have the form, $$T = \begin{pmatrix} X_0 & 0 & X_1 & 0 & X_2 & 0 & \ldots & 0 & X_{L-2} & 0 & X_{L-1} & 0 \\ A_0 & 0 & A_1 & 0 & A_2 & 0 & \ldots & 0 & A_{L-2} & 0 & A_{L-1} & 0 \\ 0 & Y_0 & 0 & Y_1 & 0 & Y_2 & \ldots & Y_{L-3} & 0 & Y_{L-2} & 0 & Y_{L-1} \\ 0 & B_0 & 0 & B_1 & 0 & B_2 & \ldots & B_{L-3} & 0 & B_{L-2} & 0 & B_{L-1} \end{pmatrix}. \quad (17)$$

According to the property of IFFT, to insert zeros into every other spectrum coefficients of a signal is equivalent to the repetition of the signal in time domain, and therefore said insertion of zeros would not change the PAPR of the signal. Because the corresponding time domain signals of the block of symbols X, A, Y, B are all single carrier signals it may be concluded that the signals transmitted on the four antennas have the same PAPR as single carrier signal.

It remains to show that the proposed space frequency encoding scheme according to the present invention, defined in (14a), has the property of SFBC+FSTD as defined in (4) to achieve transmit diversity. From (14b) we have, $$A_k = (-1)^{k+1} X^*_{(L-1-k-p) \bmod L}$$

$$A_{(L-1-k-p) \bmod L} = (-1)^{(L-1-k-p) \bmod L + 1} X^*_k. \quad (18)$$

Then the four elements $X_k$, $X_{(L-1-k-p) \bmod L}$, $A_k$, $A_{(L-1-k-p) \bmod L}$ may be expressed in the form of, $$\begin{pmatrix} X_k & X_{(L-1-k-p) \bmod L} \\ A_k & A_{(L-1-k-p) \bmod L} \end{pmatrix} = \qquad (19)$$

$$\begin{pmatrix} X_k & X_{(L-1-k-p) \bmod L} \\ (-1)^{k+1} X_{(L-1-k-p) \bmod L} & (-1)^{(L-1-k-p) \bmod L+1} X_k^* \end{pmatrix}$$

In order to enable (19) to be in the SFBC form, the two elements of the second row should have contrary signs, so the cyclic shift size p must be an even number (throughout this document L is always an even number). The obtained SFBC form will be, $$\begin{pmatrix} X_k & X_{(L-1-k-p) \bmod L} \\ A_k & A_{(L-1-k-p) \bmod L} \end{pmatrix} = \qquad (20)$$

$$\begin{cases} \begin{pmatrix} X_k & X_{(L-1-k-p) \bmod L} \\ -X_{(L-1-k-p) \bmod L}^* & X_k^* \end{pmatrix}, & k \text{ is an even number} \\ \begin{pmatrix} X_k & X_{(L-1-k-p) \bmod L} \\ X_{(L-1-k-p) \bmod L}^* & -X_k^* \end{pmatrix}, & k \text{ is an odd number,} \end{cases}$$

from which it can be observed that the kth element and the $((L-1-k-p) \bmod L)$th element of X, A are grouped into one SFBC which are transmitted from antenna 1 and antenna 2; and similarly the kth element and the $((L-1-k-p) \bmod L)$th element of Y, B are also grouped into one SFBC as shown in (21) and are transmitted from antenna 3 and antenna 4.

$$\begin{pmatrix} Y_k & Y_{(L-1-k-p) \bmod L} \\ Y_k & Y_{(L-1-k-p) \bmod L} \end{pmatrix} = \qquad (21)$$

$$\begin{cases} \begin{pmatrix} Y_k & Y_{(L-1-k-p) \bmod L} \\ -Y_{(L-1-k-p) \bmod L}^* & Y_k^* \end{pmatrix}, & k \text{ is an even number} \\ \begin{pmatrix} Y_k & Y_{(L-1-k-p) \bmod L} \\ Y_{(L-1-k-p) \bmod L}^* & -Y_k^* \end{pmatrix}, & k \text{ is an odd number.} \end{cases}$$

With reference to SFBC+FSTD, two SFBC in (4) are separately transmitted from the first group of two antennas and the second group of two antennas to achieve transmit diversity; the proposed scheme according to the invention therefore has the same structure to achieve transmit diversity as described above.

The BLER performance of SFBC is related to the distance between two elements used to create SFBC, and the distance should be as close as possible in the frequency domain. The distance is measured by the absolute value of the difference between the indices of the two elements. The distance of two elements used to create SFBC in the proposed scheme is shown below, $$(X_0 \ X_1 \ \ldots \ X_{L-p-2} \ X_{L-p-1}) \ (X_{L-p} \ X_{L-p+1} \ \ldots \ X_{L-2} \ X_{L-1}). \qquad (22)$$

with brackets indicating L-p-1, L-p-2 and p-1, p-2 from which it may be observed that the maximum distance between the two elements used to create SFBC is max(L−p−1, p−1), and then we should select the cyclic shift size p satisfying p=min max(L−p−1, p−1) to reduce the maximum distance. The typical value of cyclic shift size p is $$p = \begin{cases} L/2, & L/2 \text{ is even number} \\ L/2+1, & L/2 \text{ is odd number.} \end{cases}$$

Finally, sub-carrier mapping may be performed on the encoded symbols in (14a), as shown in FIG. 3, by separately mapping each modified block of symbols for transmission X', Y', A', B' onto M sub-carriers of the four antennas for transmission, where the M sub-carriers could be localized or equal distance distributed depending on the application in which the encoding should be performed.

Non-limiting example:

Given that DFT size L=8 and cyclic shift size p=8/2=4, two blocks of time domain modulation symbols are defined as $x=\{x_0, x_1, x_2, x_3, x_4, x_5, x_6, x_7\}$ and $y=\{y_0, y_1, y_2, y_3, y_4, y_5, y_6, y_7\}$. After two separate DFT operations, corresponding first and second block of symbols are therefore $X=\{X_0, X_1, X_2, X_3, X_4, X_5, X_6, X_7\}$ and $Y=\{Y_0, Y_1, Y_2, Y_3, Y_4, Y_5, Y_6, Y_7\}$, where said first and said second block of symbols each comprises eight elements, and each element corresponds to a DFT sample where, $$X_k = \sum_{n=0}^{7} x_n \exp\left(\frac{-j2\pi nk}{8}\right), k = 0, 1, 2, \ldots, 7 \qquad (23)$$

$$Y_k = \sum_{n=0}^{7} y_n \exp\left(\frac{-j2\pi nk}{8}\right), k = 0, 1, 2, \ldots, 7.$$

The elements of the first block of symbols $X=\{X_0, X_1, X_2, X_3, X_4, X_5, X_6, X_7\}$ are reversed, cyclically shifted with half size and conjugated, and then minus a sign is added on every other element to obtain a third block of symbols A, wherein $A=\{-X_3^*, X_2^*, -X_1^*, X_0^*, -X_7^*, X_6^*, -X_5^*, X_4^*\}$. The same operations are performed on the elements in the second block of symbols $Y=\{Y_0, Y_1, Y_2, Y_3, Y_4, Y_5, Y_6, Y_7\}$ to obtain a fourth block of symbols $B=\{-Y_3^*, Y_2^*, -Y_1^*, Y_0^*, -Y_7^*, Y_6^*, -Y_5^*, Y_4^*\}$. Then blocks of D number of zeros are inserted after each D number of elements in the first and third block of symbols X and A, respectively, to obtain a first and a third modified block of symbols for transmission X' and A', respectively, while blocks of D number of zeros are inserted before each D number of elements in the second and fourth block of symbols Y and B, respectively, to obtain a second and a fourth modified block of symbols for transmission Y' and B', respectively. When D=L=8 (in this non-limiting example) the encoded matrix T equals, $$T = \begin{pmatrix} X_0 & X_1 & X_2 & X_3 & X_4 & X_5 & X_6 & X_7 & 0 & 0 & 0 & 0 & 0 & 0 & 0 & 0 \\ -X_3^* & X_2^* & -X_1^* & X_0^* & -X_7^* & X_6^* & -X_5^* & X_4^* & 0 & 0 & 0 & 0 & 0 & 0 & 0 & 0 \\ 0 & 0 & 0 & 0 & 0 & 0 & 0 & 0 & Y_0 & Y_1 & Y_2 & Y_3 & Y_4 & Y_5 & Y_6 & Y_7 \\ 0 & 0 & 0 & 0 & 0 & 0 & 0 & 0 & -Y_3^* & Y_2^* & -Y_1^* & Y_0^* & -Y_7^* & Y_6^* & -Y_5^* & Y_4^* \end{pmatrix}, \quad (24)$$

and when D=1 (in this non-limiting example) the encoding matrix T equals, $$T = \begin{pmatrix} X_0 & 0 & X_1 & 0 & X_2 & 0 & X_3 & 0 & X_4 & 0 & X_5 & 0 & X_6 & 0 & X_7 & 0 \\ -X_3^* & 0 & X_2^* & 0 & -X_1^* & 0 & X_0^* & 0 & -X_7^* & 0 & X_6^* & 0 & -X_5^* & 0 & X_4^* & 0 \\ 0 & Y_0 & 0 & Y_1 & 0 & Y_2 & 0 & Y_3 & 0 & Y_4 & 0 & Y_5 & 0 & Y_6 & 0 & Y_7 \\ 0 & -Y_3^* & 0 & Y_2^* & 0 & -Y_1^* & 0 & Y_0^* & 0 & -Y_7^* & 0 & Y_6^* & 0 & -Y_5^* & 0 & Y_4^* \end{pmatrix}. \quad (25)$$

Finally, the four rows of the encoding matrix are mapped onto 16 sub-carriers of four transmit antennas; respectively, for transmission.

Figure 4:
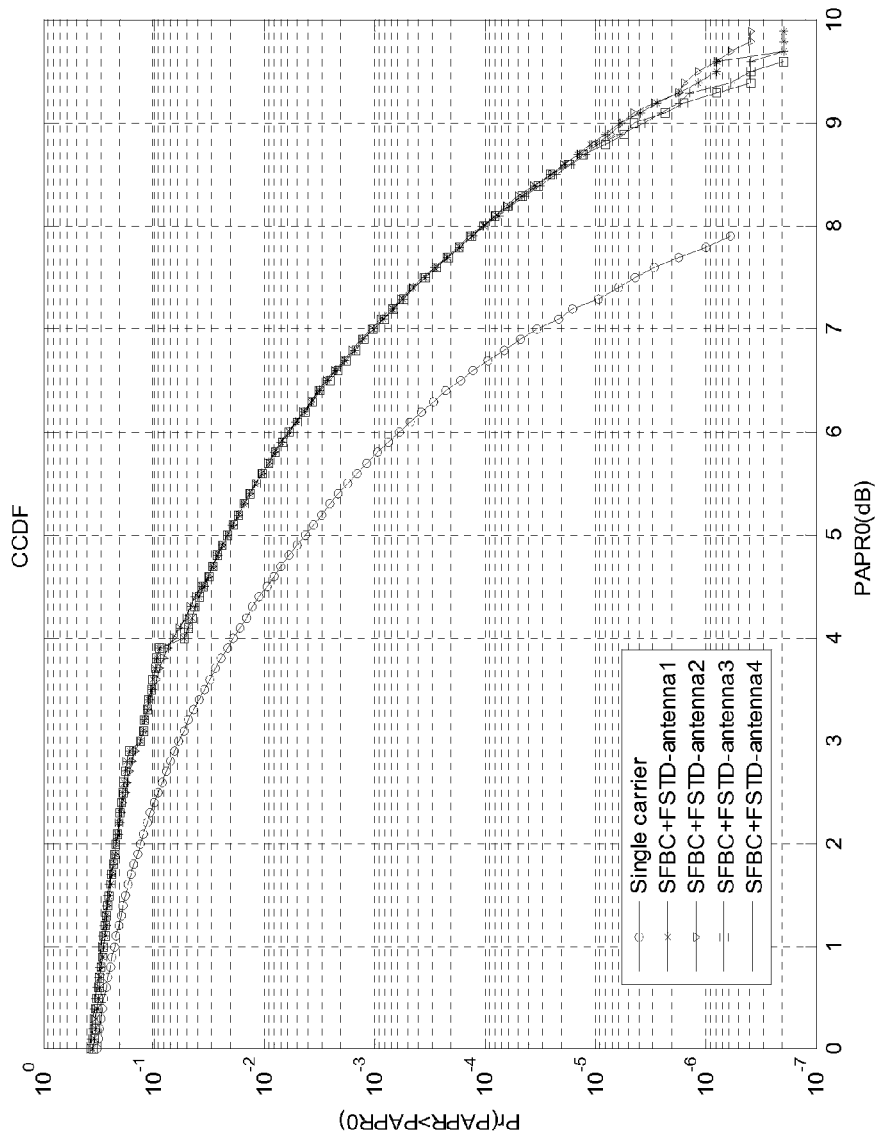
FIG. 4 shows PAPR for a prior art scheme.
Figure 5:
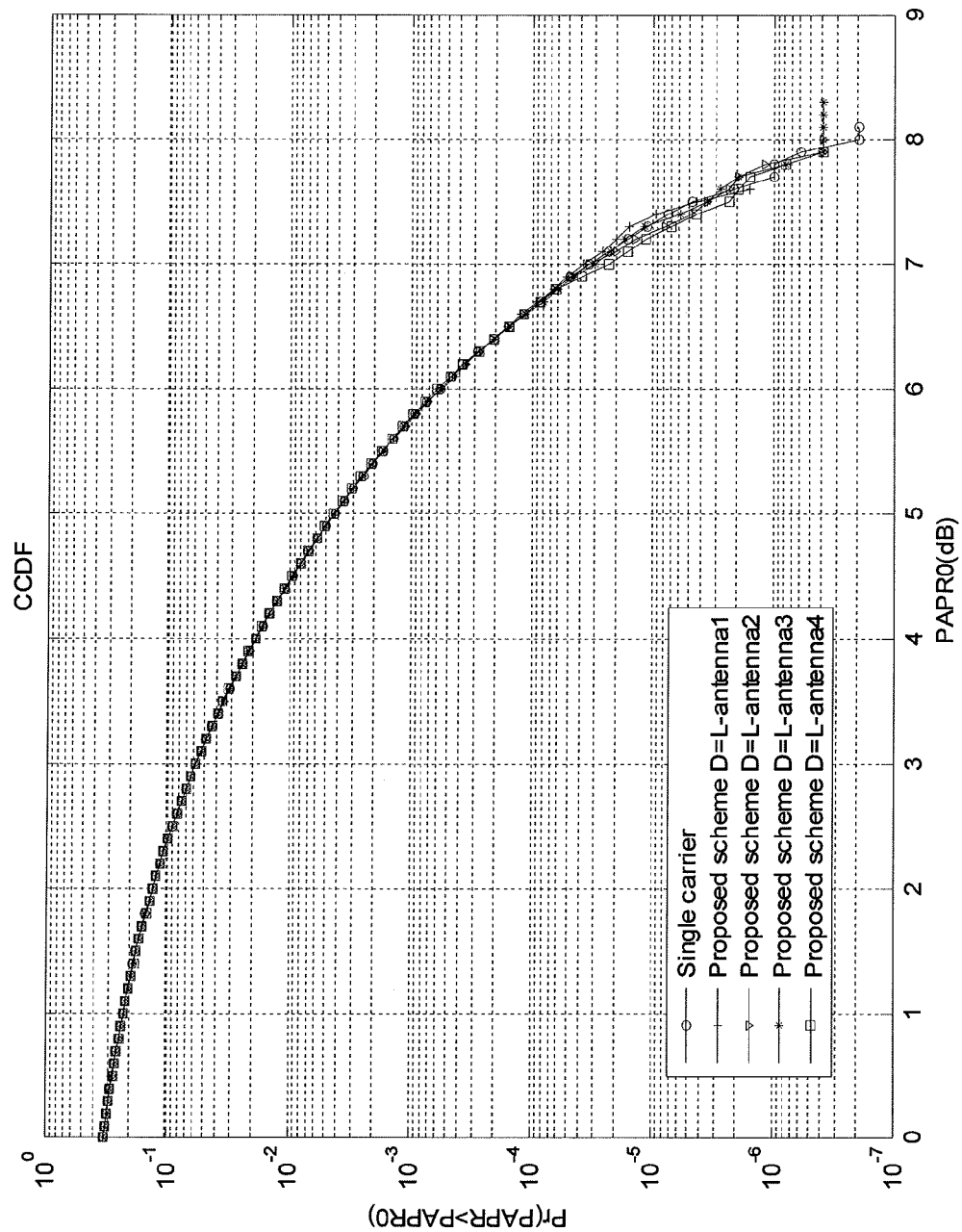
FIG. 5 shows PAPR for an example embodiment D=L of the invention.
Figure 6:
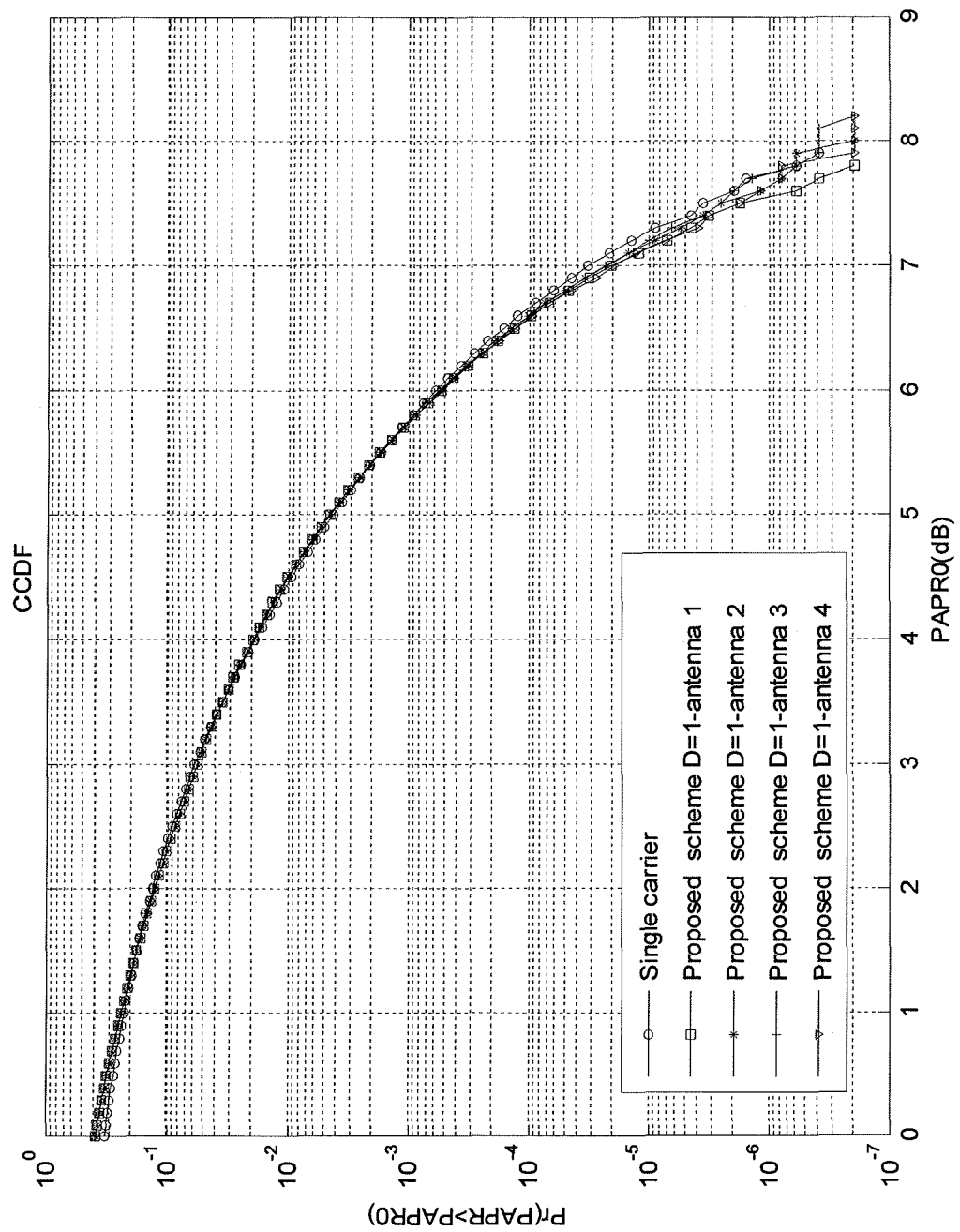
FIG. 6 shows PAPR for an example embodiment D=1 of the invention.
Figure 7:
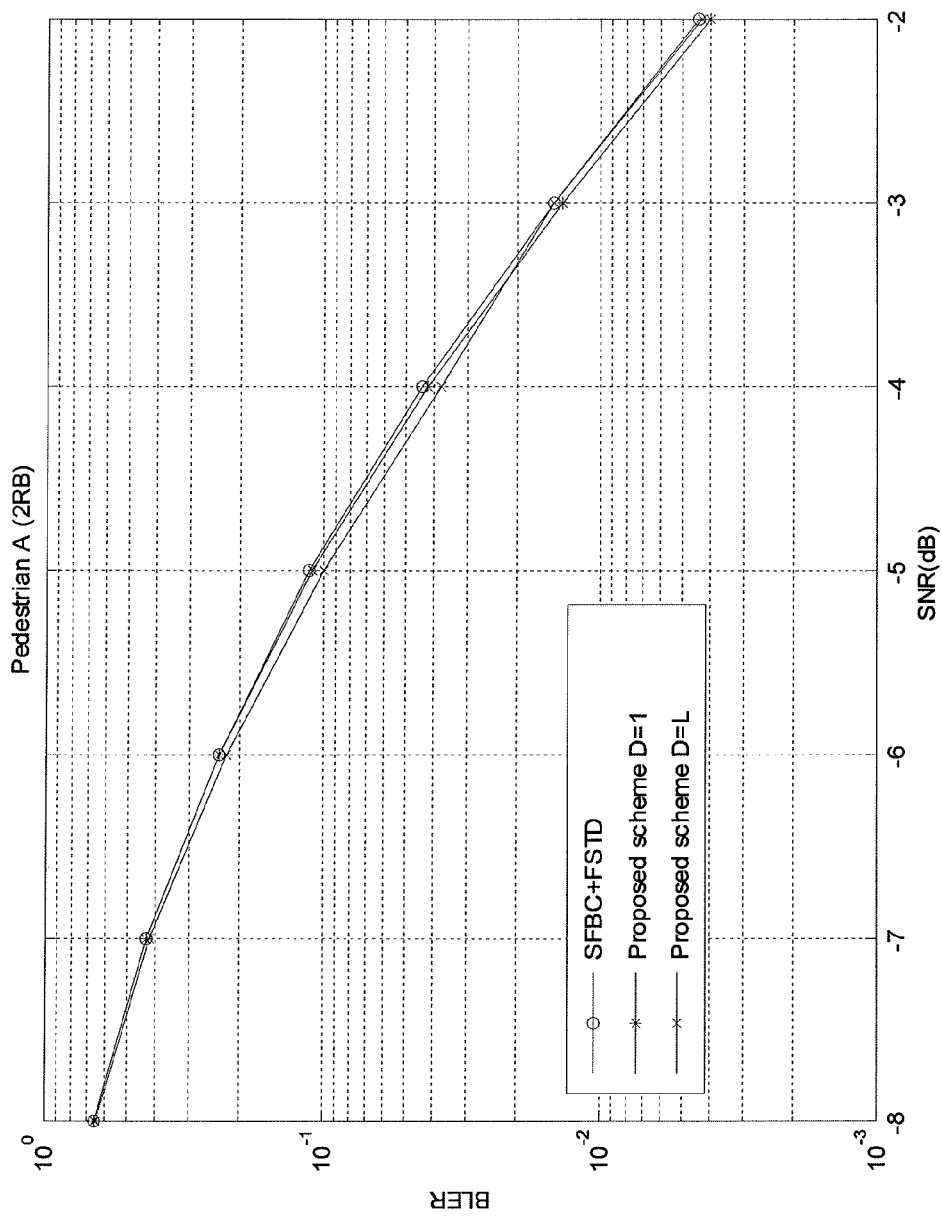
FIG. 7 shows performance of example embodiments D=1 and D=L of the invention in a Pedestrian A channel with 2 RBs.
Figure 8:
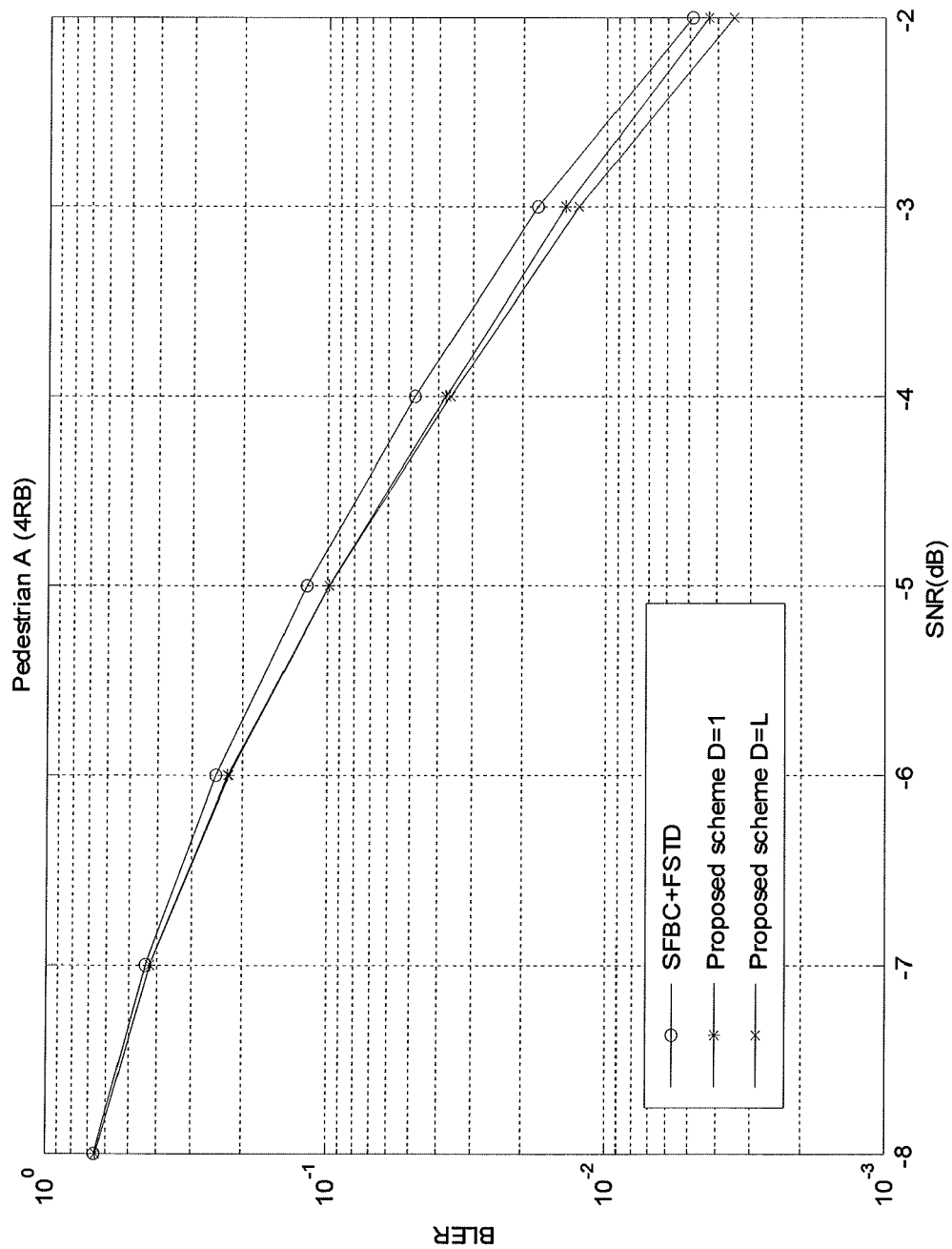
FIG. 8 shows performance of example embodiments D=1 and D=L of the invention in a Pedestrian A channel with 4 RBs.
Figure 9:
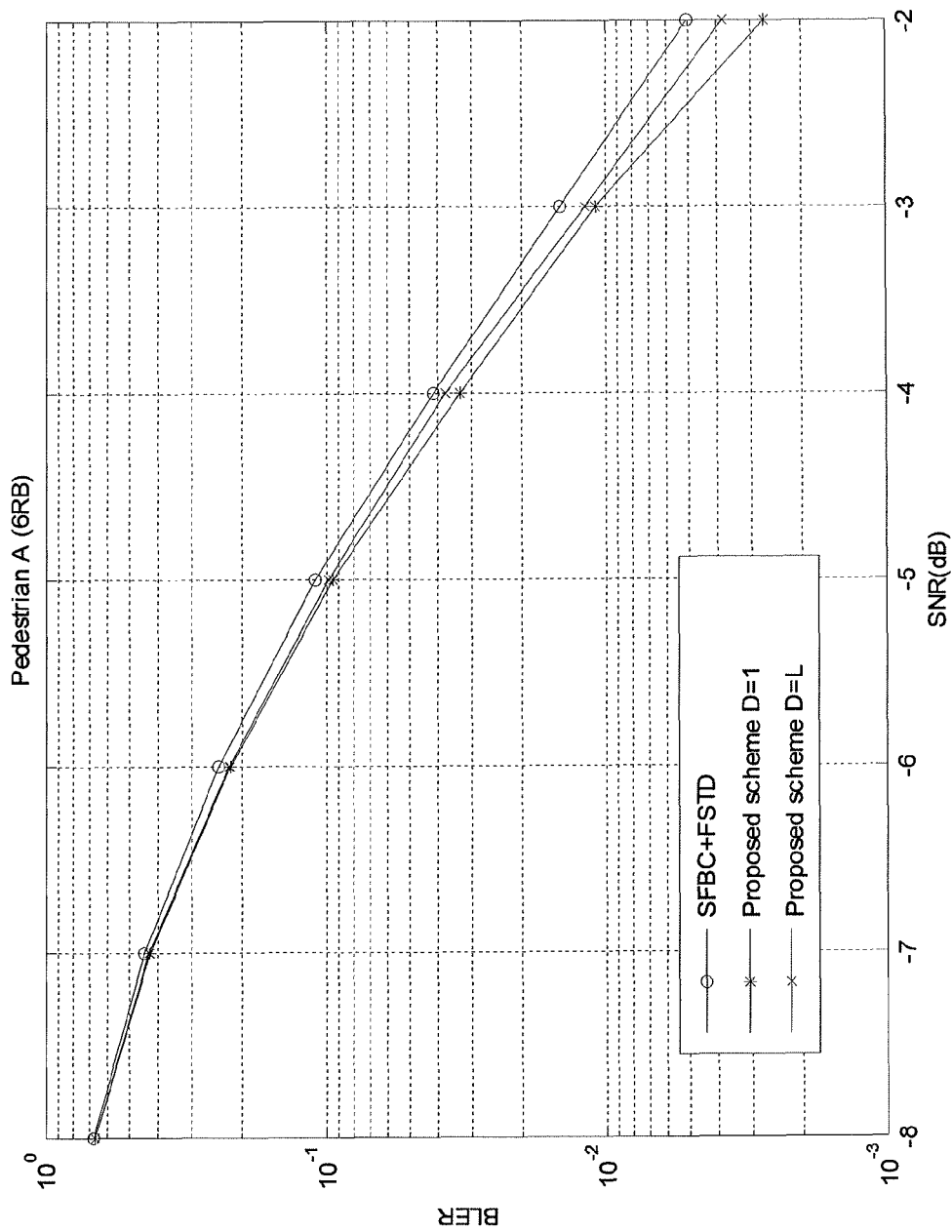
FIG. 9 shows performance of example embodiments D=1 and D=L of the invention in a Pedestrian A channel with 6 RBs.
Figure 10:
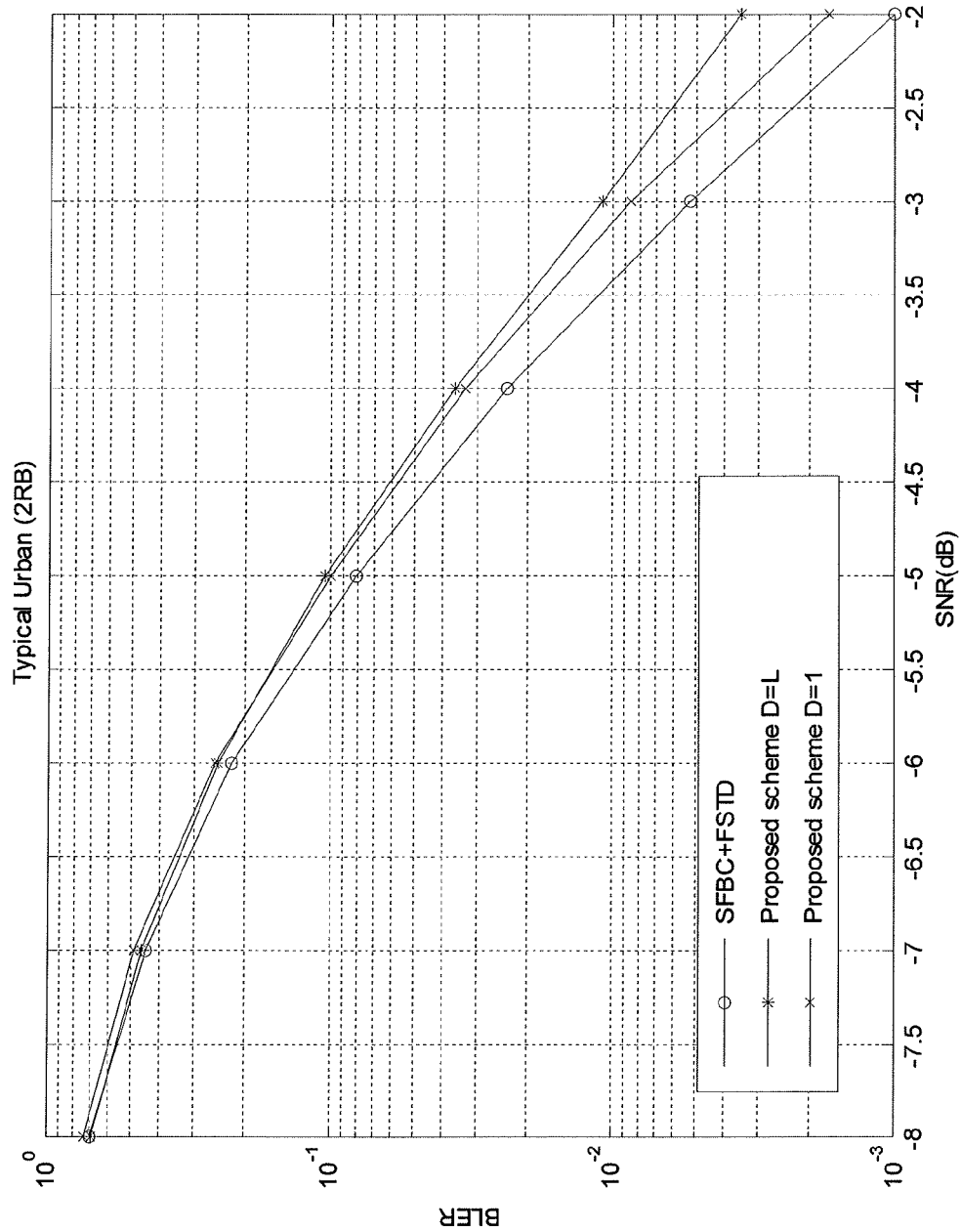
FIG. 10 shows performance of example embodiments D=1 and D=L of the invention in a TU-channel with 2 RBs.
Figure 11:
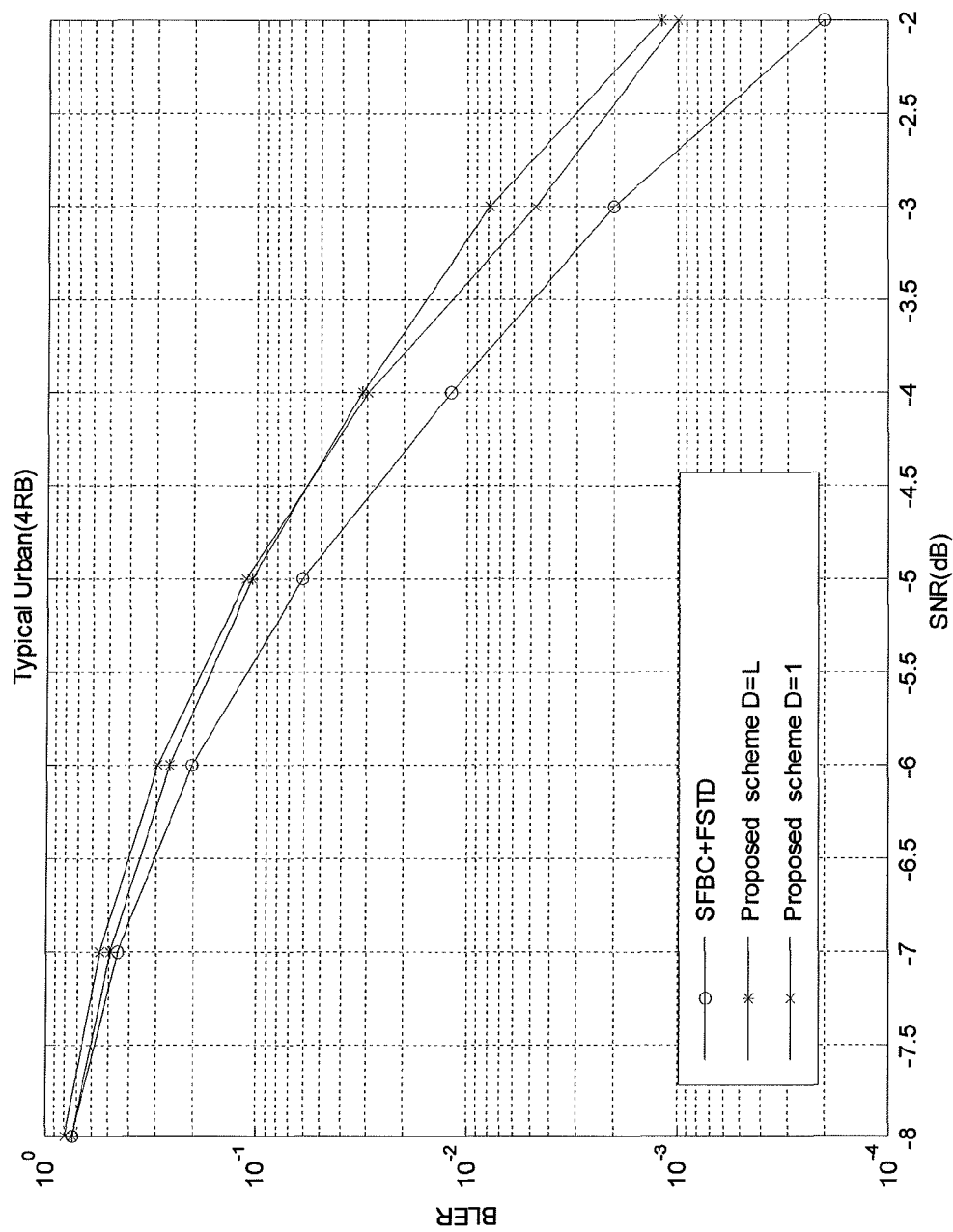
FIG. 11 shows performance of example embodiments D=1 and D=L of the invention in a TU-channel 4 RBs.
Figure 12:
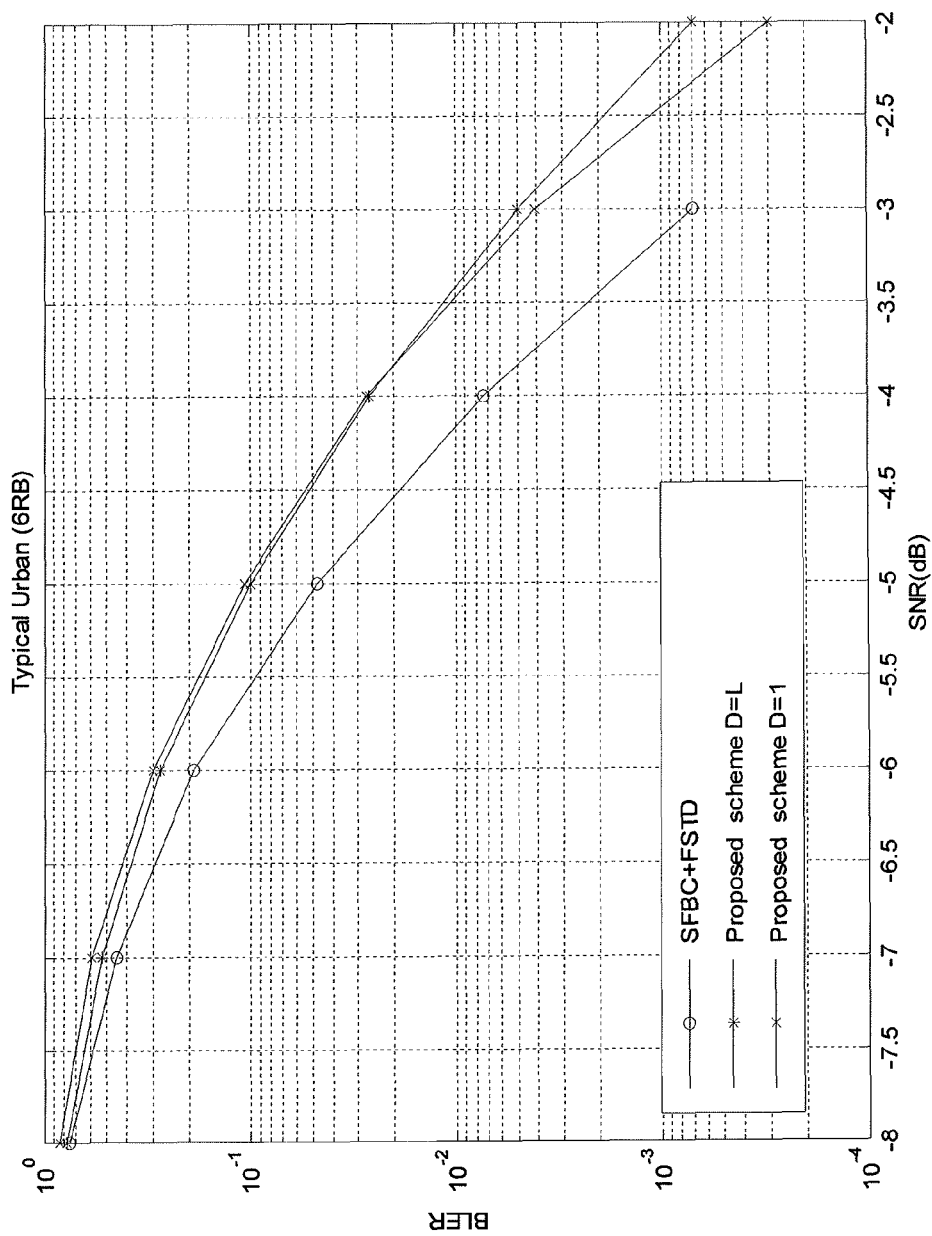
FIG. 12 shows performance of example embodiments D=1 and D=L of the invention in a TU-channel with 6 RBs.

The numerical evaluation of PAPR is shown in FIGS. 4-6, with the simulation assumptions according to Table 1 below. The PAPR of prior art SFBC+FSTD is shown in FIG. 4, and the PAPR evaluations of the two embodiments (D=L, FIG. 5, and D=1, FIG. 6) of the proposed scheme according to the invention are separately shown in FIGS. 5-6. It can be observed from these figures that the prior art solution has 1.3 dB PAPR increase over single carrier signal at probability $10^{-4}$ due to destroying the single carrier property of the SFBC+FSTD, while the proposed scheme according to the invention has the same PAPR as the single carrier signal.

TABLE 1

| Simulation Assumptions - PAPR | |
|---|---|
| System bandwidth | 5 MHz |
| IFFT size | 512 |
| Number of effective sub-carriers | 300 |
| Number of occupied data sub-carriers | 128 |
| Modulation scheme | QPSK |
| Resource allocation type | Localized |

The performance in terms of BLER of the prior art SFBC+FSTD and the proposed scheme according to the invention have been simulated and compared in two typical channel models i.e. in a Pedestrian A channel with low frequency selectivity, and in a Typical Urban (TU)-channel with high frequency selectivity, with the simulation assumptions according to Table 2 below. The simulation results are shown in FIGS. 7-12. It can be observed from these figures that the proposed scheme has a small gain over the SFBC+FSTD in the Pedestrian A channel; however there is about 0.3~0.7 dB performance loss at target BLER $10^{-2}$ in the TU-channel when 2, 4 and 6 Resource Blocks (RBs) are allocated for data transmission. It should be noted that a transmit diversity scheme is used for control channels or low geometry scenario to improve performance in this cases, and the number of allocated RBs for data transmission is rather small in these two scenarios, and therefore the performance loss due to the frequency selectivity would be less than 0.7 dB. In low frequency selectivity channel, the proposed scheme has better BLER performance than SFBC+FSTD; and in high frequency selectivity channel, there is less than 0.7 dB BLER performance loss relative to SFBC+FSTD, however the less than 0.7 dB performance loss in BLER is acceptable compared with the 1.3 dB PAPR increase due to employing SFBC+FSTD. The two different embodiments shows almost the same performance in the case of the Pedestrian A channel; in the case of the TU-channel the performance for D=1 is slightly improved (about 0.2 dB gain) over the case when D=L for the 2 and 4 RB resources allocation at BLER $10^{-2}$, while the case when D=1 has 0.1 dB gain over D=L for the 6 RB allocation.

TABLE 2

| Simulation Assumptions - BLER Performance | |
|---|---|
| Bandwidth | 5 MHz |
| Sampling frequency | 7.68 MHz |
| IFFT size | 512 |
| Channel model | Pedestrian A and TU |
| Modulation | QPSK |
| Channel coding | Turbo code, coding rate = 1/2 |
| Receive antenna | 2 |
| Channel estimation | Ideal |

Figure 13:
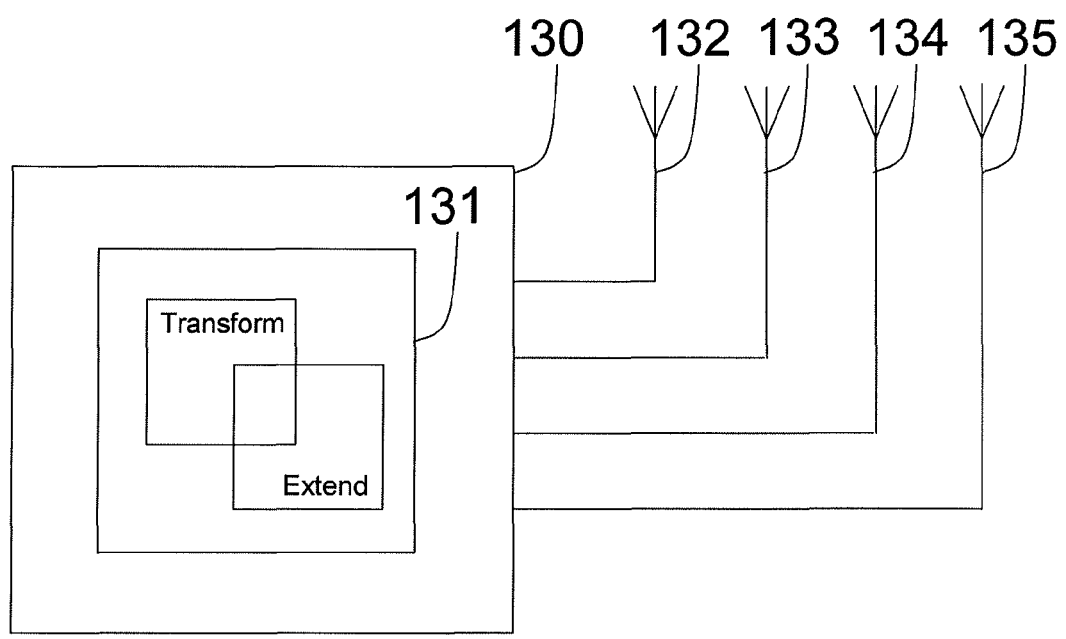
FIG. 13 illustrates schematically an apparatus according to an example embodiment of the invention.

FIG. 13 illustrates schematically an apparatus according to an example embodiment of the invention. The apparatus (130) comprises processing circuitry (131) and four antennas (132)-(135). The processing circuitry (131) comprises a transform entity for transformation and an extension entity for extension of blocks of symbols. The transform entity is configured for reversing the sequential order of elements representing a block, cyclically shifting the elements corresponding to the block and complex conjugating the elements. The extension entity is configured to extend the block length by adding, depending on what particular block of elements, zeros between elements representing a block of symbols. The zeroes are added in groups before or after groups of consecutive elements. The size of the group of zeroes equals the size of the groups of consecutive elements. In an example embodiment with group size equal to one, a single zero is added before or after each one of the elements representing a block of symbols. The elements as achieved by the transforming and extending are preferably arranged in a transmit matrix and the elements provided to the four transmit antennas (132)-(135).

As understood by a person skilled in the art said apparatus may be configured in accordance with the different embodiments described in relation to the method as described above. Furthermore, as also understood by the person skilled in the art, the method for transmit diversity encoding according to the invention may be implemented by computer program code means, which when run in a computer causes the computer to execute the method. The computer program is preferably included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

While the invention has been described in connection with specific embodiments thereof, it will be understood that it is capable of further modifications. This application is intended to cover any variations, uses, adaptations or implementations of the invention, not excluding software enabled units and devices, within the scope of subsequent claims following, in general, the principles of the invention as would be obvious to a person skilled in the art to which the invention pertains.

$$T = \begin{pmatrix} X_0\ X_1\ \ldots\ X_{D-1} & \overbrace{0\ 0\ \ldots\ 0}^{D\ zeros} & X_D\ X_{D+1}\ \ldots\ X_{2D-1} & \overbrace{0\ 0\ \ldots\ 0}^{D\ zeros} & \ldots & X_{L-D}\ X_{L-D+1}\ \ldots\ X_{L-1} & \overbrace{0\ 0\ \ldots\ 0}^{D\ zeros} \\ A_0\ A_1\ \ldots\ A_{D-1} & \overbrace{0\ 0\ \ldots\ 0}^{D\ zeros} & A_D\ A_{D+1}\ \ldots\ A_{2D-1} & \overbrace{0\ 0\ \ldots\ 0}^{D\ zeros} & \ldots & A_{L-D}\ A_{L-D+1}\ \ldots\ A_{L-1} & \overbrace{0\ 0\ \ldots\ 0}^{D\ zeros} \\ \overbrace{0\ 0\ \ldots\ 0}^{D\ zeros} & Y_0\ Y_1\ \ldots\ Y_{D-1} & \overbrace{0\ 0\ \ldots\ 0}^{D\ zeros} & Y_D\ Y_{D+1}\ \ldots\ Y_{2D-1} & \ldots & \overbrace{0\ 0\ \ldots\ 0}^{D\ zeros} & Y_{L-D}\ Y_{L-D+1}\ \ldots\ Y_{L-1} \\ \overbrace{0\ 0\ \ldots\ 0}^{D\ zeros} & B_0\ B_1\ \ldots\ B_{D-1} & \overbrace{0\ 0\ \ldots\ 0}^{D\ zeros} & B_D\ B_{D+1}\ \ldots\ B_{2D-1} & \ldots & \overbrace{0\ 0\ \ldots\ 0}^{D\ zeros} & B_{L-D}\ B_{L-D+1}\ \ldots\ B_{L-1} \end{pmatrix},$$

We claim:

1. A method for transmit diversity encoding of symbols to be transmitted by a transmitter in a wireless communication system, wherein said transmitter employs four transmit antennas, said method comprising, for a first block of symbols and a second block of symbols, each of said first and second block of symbols being represented by a number of elements, the number being equal to L determining a third block of symbols, being represented by L elements, by reversing, cyclically shifting and conjugating the elements representing said first block of symbols and adding a minus sign to every other of the elements achieved from the reversing, cyclically shifting and conjugating the elements representing the first block of symbols, determining a fourth block of symbols, being represented by L elements, by reversing, cyclically shifting and conjugating the elements representing said second block of symbols and adding a minus sign to every other of the elements achieved from the reversing, cyclically shifting and conjugating the elements representing the second block of symbols, inserting a number of zeroes, the number being equal to D, after every group of D consecutive elements of the elements representing said first and third block of symbols, respectively, so as to obtain a modified first block of symbols for transmission and a modified third block of symbols for transmission, and inserting a number of zeros, the number being equal to D, before every group of D consecutive elements of the elements representing said second and fourth block of symbols, respectively, so as to obtain a modified second block of symbols for transmission and a modified fourth block of symbols for transmission, wherein said modified first, second, third, and fourth block of symbols for transmission are provided for transmission from said four transmit antennas, and wherein the elements representing said block of symbols are cyclically shifted with a shift size p, wherein p is an even number.

2. The method according to claim 1, comprising:
providing the blocks of symbols for transmission according to a matrix representation T comprising four rows, each row of the matrix T comprising elements representing said modified first, second, third and fourth blocks of symbols for transmission, respectively, as determined from elements $X_0, X_1, \ldots, X_{L-1}$ representing said first block of symbols, elements $Y_0, Y_1, \ldots, Y_{L-1}$ representing said second block of symbols, elements $A_0, A_1, \ldots, A_{L-1}$ representing said third block of symbols, and elements $B_0, B_1, \ldots, B_{L-1}$ representing said fourth block of symbols.

3. The method according to claim 2, wherein encoded matrix, T, for transmission has the form, wherein each row in said encoded matrix T for transmission corresponds to one of said four transmit antennas, and each column in said encoded matrix for transmission corresponds to a sub-carrier, and wherein the kth element in said first, second, third and fourth block of symbols are represented by $X_k, Y_k, A_k, B_k$, respectively, where $k=0, 1, \ldots, L-1$.

4. The method according to claim 2, wherein and encoded matrix T for transmission has the form, $$T = \begin{pmatrix} X_0 & 0 & X_1 & 0 & X_2 & 0 & \ldots & 0 & X_{L-2} & 0 & X_{L-1} & 0 \\ A_0 & 0 & A_1 & 0 & A_2 & 0 & \ldots & 0 & A_{L-2} & 0 & A_{L-1} & 0 \\ 0 & Y_0 & 0 & Y_1 & 0 & Y_2 & \cdots & Y_{L-3} & 0 & Y_{L-2} & 0 & Y_{L-1} \\ 0 & B_0 & 0 & B_1 & 0 & B_2 & \ldots & B_{L-3} & 0 & B_{L-2} & 0 & B_{L-1} \end{pmatrix}.$$

5. The method according to claim 2, wherein encoded matrix T for transmission has the form, $$T = \begin{pmatrix} X_0\ X_1\ X_2\ \ldots\ X_{L-2}\ X_{L-1} & \overbrace{0\ 0\ 0\ \ldots\ 0\ 0}^{L\ zeros} \\ A_0\ A_1\ A_2\ \ldots\ A_{L-2}\ A_{L-1} & \overbrace{0\ 0\ 0\ \ldots\ 0\ 0}^{L\ zeros} \\ \overbrace{0\ 0\ 0\ \ldots\ 0\ 0}^{L\ zeros} & Y_0\ Y_1\ Y_2\ \ldots\ Y_{L-2}\ Y_{L-1} \\ \overbrace{0\ 0\ 0\ \ldots\ 0\ 0}^{L\ zeros} & A_0\ A_1\ A_2\ \ldots\ A_{L-2}\ A_{L-1} \end{pmatrix}.$$

6. The method according to claim 1, wherein D=1 or D=L.

7. The method according to claim 1, wherein each of said four transmit antennas is allocated a number of sub-carriers for transmission equal to 2L.

8. The method according to claim 7, wherein said sub-carriers are consecutive in the frequency domain.

9. The method according to claim 7, wherein said sub-carriers are equal distance distributed.

10. The method according to claim 2, wherein a kth element of the elements representing said third block of symbols is $$A_k = (-1)^{k+1} X^*_{(L-1-k-p)modL}, k=0,1,\ldots,L-1,$$

and kth element of the elements representing said fourth block of symbols, B, is $$B_k = (-1)^{k+1} Y^*_{(L-1-k-p)modL}, k=0,1,\ldots,L-1,$$

where mod L is the modulo L operator, p is a cyclical shift size, and $X^*_{(L-1-k-p) mod L}$ and $Y^*(L-1-k-p) mod L$ is the complex conjugate of the ((L−1−k−p)mod L)th element representing said first and second block of symbols, respectively.

11. The method according to claim 2, wherein a kth element of the elements representing said third block of symbols, is $$A_k = (-1)^k X^*_{(L-1-k-p)modL}, k=0,1,\ldots,L-1,$$

and a kth element of the elements representing said fourth block of symbols is $$B_k = (-1)^k Y^*_{(L-1-k-p)modL}, k=0,1,\ldots,L-1,$$

where mod L is the modulo L operator, p is a cyclically shift size, and $X^*_{(L-1-k-p) mod L}$ and $Y^*_{(L-1-k-p) mod} L$ is the complex conjugate of the ((L−1−k−p)mod L)th element of said first and second blocks of symbols, respectively.

12. The method according to claim 1, wherein said shift size p equals L/2, when L/2 is an even number.

13. The method according to claim 11, wherein said shift size p equals L/2+1 or L/2−1, when L/2 is an odd number.

14. The method according to claim 1, wherein said first and second blocks of symbols are determined by,
for a first block of time domain symbols x and a second block of time domain symbols y, each of said first and second blocks of time domain symbols x, y comprising L symbols, where L is an integer,
performing discrete Fourier transform separately on said first and second block of time domain symbols x, y to obtain said first and second blocks of symbols, respectively, each of said first and second block of symbols comprising L DFT samples, for a Discrete Fourier Transform, DFT.

15. The method according to claim 14, wherein the symbols in said first and second block of time domain symbols x, y belong to a modulation constellation of BPSK, QPSK, 16QAM or 64QAM.

16. The method according to claim 14, wherein said first and second blocks of time domain symbols x, y originate from a same codeword, where the codeword is achieved after channel coding and modulation.

17. The method according to claim 14, wherein each of said first and second blocks of time domain symbols x, y originate from a codeword, where the codeword is achieved after channel coding and modulation.

18. A non-transitory computer program product comprising computer program code means on a recording carrier, which when run in a computer causes the computer to provide control of an apparatus of signal processing to execute transmit diversity encoding of symbols to be transmitted by a transmitter in a wireless communication system, wherein said transmitter employs four transmit antennas, said transmit diversity encoding comprising, for a first block of symbols and a second block of symbols, each of said first and second block of symbols being represented by a number of elements, the number being equal to L,
determining a third block of symbols, being represented by L elements, by reversing, cyclically shifting and conjugating the elements representing said first block of symbols and adding a minus sign to every other of the elements achieved from the reversing, cyclically shifting and conjugating the elements representing the first block of symbols,
determining a fourth block of symbols, being represented by L elements, by reversing, cyclically shifting and conjugating the elements representing said second block of symbols and adding a minus sign to every other of the elements achieved from the reversing, cyclically shifting and conjugating the elements representing the second block of symbols,
inserting a number of zeroes, the number being equal to D, after every group of D consecutive elements of the elements representing said first and third block of symbols, respectively, so as to obtain a modified first block of symbols for transmission and a modified third block of symbols for transmission, and
inserting a number of zeros, the number being equal to D, before every group of D consecutive elements of the elements representing said second and fourth block of symbols, respectively, so as to obtain a modified second block of symbols for transmission and a modified fourth block of symbols for transmission,
wherein said modified first, second, third, and fourth block of symbols for transmission are provided for transmission from said four transmit antennas, and wherein the elements representing said block of symbols are cyclically shifted with a shift size p, wherein p is an even number.

19. An apparatus for transmit diversity encoding of symbols to be transmitted by a transmitter in a wireless communication system, wherein said transmitter employs four transmit antennas, having processing circuitry configured for operations on a first block of symbols, X, and a second block of symbols, Y, wherein each of said first block of symbols, X, and said second block of symbols, Y, is represented by a number of elements, the number being equal to L, the apparatus comprising
a transform entity for determining a third block of symbols, A, corresponding to reversing, cyclically shifting and conjugating the elements representing said first block of symbols, X, and adding a minus sign to every other of the elements as achieved from the reversing, cyclical shifting and conjugating of the elements representing first block of symbols X, and for determining a fourth block of symbols, B, corresponding to reversing, cyclically shifting and conjugating the elements representing said second block of symbols, Y, and adding a minus sign to every other of the elements as achieved from the reversing, cyclical shifting and conjugating of the elements representing second block of symbols, Y; and
an extension entity configured for inserting a number of zeros, the number being equal to D, corresponding to after every group of D consecutive elements inserting D consecutive zeroes for said first block of symbols, X, and said third block of symbols, A, so as to obtain a modified first block of symbols for transmission, X', and a modified third block of symbols for transmission, A', and for inserting a number of zeros, the number being equal to D, corresponding to before every group of D consecutive elements inserting D consecutive zeroes for said second block of symbols, Y, and said fourth block of symbols, B, so as to obtain a modified second block of symbols for transmission, Y', and a modified fourth block of symbols for transmission, B',
the apparatus being arranged for providing said modified first, second, third, and fourth block of symbols for transmission, X', Y', A', B', for transmission from said four transmit antennas, wherein the elements representing said block of symbols are cyclically shifted with a shift size p, wherein p is an even number.

20. The apparatus according to claim 19, wherein the processing circuitry is arranged for: providing the blocks of symbols for transmission according to a matrix representation T comprising four rows, each row of the matrix T comprising elements representing said modified first, second, third and fourth blocks of symbols for transmission, respectively, as determined from elements $X_0, X_1, \ldots, X_{L-1}$ representing said first block of symbols, elements $Y_0, Y_1, \ldots, Y_{L-1}$ representing said second block of symbols, elements $A_0, A_1, \ldots, A_{L-1}$ representing said third block of symbols, and elements $B_0, B_1, \ldots, B_{L-1}$ representing said fourth block of symbols.

* * * * *